United States Patent
Li et al.

(10) Patent No.: US 11,271,691 B2
(45) Date of Patent: Mar. 8, 2022

(54) DYNAMIC SPECTRUM SPREADING OF DATA SYMBOLS FOR MULTIPLE ACCESS TRANSMISSION

(71) Applicants: Hao Li, London (CA); Xianbin Wang, London (CA); Kwok Shum Au, Ottawa (CA); Osama Aboul-Magd, Ottawa (CA); Jung Hoon Suh, Ottawa (CA)

(72) Inventors: Hao Li, London (CA); Xianbin Wang, London (CA); Kwok Shum Au, Ottawa (CA); Osama Aboul-Magd, Ottawa (CA); Jung Hoon Suh, Ottawa (CA)

(73) Assignee: Huawei Technologies Canada Co. Ltd., Kanata (CA)

( * ) Notice: Subject to any disclaimer, the term of this patent is extended or adjusted under 35 U.S.C. 154(b) by 0 days.

(21) Appl. No.: 16/030,131

(22) Filed: Jul. 9, 2018

(65) Prior Publication Data
US 2020/0014506 A1     Jan. 9, 2020

(51) Int. Cl.
| | |
|---|---|
| H04W 4/00 | (2018.01) |
| H04L 5/00 | (2006.01) |
| H04L 27/26 | (2006.01) |
| H04W 52/02 | (2009.01) |
| H04W 52/50 | (2009.01) |
| H04B 1/707 | (2011.01) |
| H04W 84/12 | (2009.01) |

(52) U.S. Cl.
CPC .......... H04L 5/0017 (2013.01); H04B 1/707 (2013.01); H04L 5/0042 (2013.01); H04L 5/0044 (2013.01); H04L 5/0094 (2013.01); H04L 27/2614 (2013.01); H04W 52/0222 (2013.01); H04W 52/0261 (2013.01); H04W 52/50 (2013.01); H04W 84/12 (2013.01)

(58) Field of Classification Search
CPC ... H04L 5/0017; H04L 5/0042; H04L 5/0044; H04L 5/0094; H04L 27/2614; H04W 52/0222; H04W 52/0261; H04W 52/50; H04B 1/707
USPC ................ 370/329–330, 335–345, 347–348
See application file for complete search history.

(56) References Cited

U.S. PATENT DOCUMENTS

| | | | |
|---|---|---|---|
| 6,987,747 B1 * | 1/2006 | Mottier | H04J 13/16 370/335 |
| 7,733,939 B2 | 6/2010 | Trachewsky | |

(Continued)

OTHER PUBLICATIONS

W. Sun et al., "IEEE 802.11ah: A Long Range 802.11 WLAN at Sub 1 GHz", Journal of ICT Standardization, vol. 1, No. 1, Jul. 2013.
(Continued)

*Primary Examiner* — Thai D Hoang

(57) ABSTRACT

Methods and systems that enable payload data to be spread over a number of a plurality of sub-carriers for wireless transmissions between Access Points (AP) and stations (STA) in a WLAN. The AP receives each STA's status information, and controls an amount of spreading of the payload data that can flexibly and variably takes into account the desired amount of peak power consumption, the required data rate, and the channel conditions. Based on these factors, the AP determines a number of sub-carriers for each STA that will be used to carry the spread payload data. Example embodiments can address high power peak consumption, data rate inflexibility and inefficient spectrum communication as found in conventional wireless systems.

15 Claims, 17 Drawing Sheets

(56) References Cited

U.S. PATENT DOCUMENTS

| | | | |
|---|---|---|---|
| 8,155,230 B2 | 4/2012 | Ktenas et al. | |
| 10,420,026 B2* | 9/2019 | Tamura | H04W 36/22 |
| 2003/0076812 A1* | 4/2003 | Benedittis | H04B 7/2668 |
| | | | 370/350 |
| 2003/0093264 A1* | 5/2003 | Miyasaka | G10L 19/18 |
| | | | 704/205 |
| 2004/0258134 A1* | 12/2004 | Cho | H04L 5/0046 |
| | | | 375/131 |
| 2005/0157670 A1* | 7/2005 | Tang | H04L 5/0039 |
| | | | 370/320 |
| 2006/0215536 A1* | 9/2006 | Mottier | H04B 1/692 |
| | | | 370/203 |
| 2007/0036068 A1 | 2/2007 | Cho et al. | |
| 2010/0232307 A1* | 9/2010 | Kim | H04L 5/006 |
| | | | 370/252 |
| 2012/0094706 A1* | 4/2012 | Fukumoto | H04W 72/048 |
| | | | 455/512 |
| 2014/0369320 A1* | 12/2014 | Gurcan | H04B 7/0443 |
| | | | 370/335 |
| 2015/0189548 A1* | 7/2015 | Ahmad | H04W 28/08 |
| | | | 370/235 |
| 2015/0282032 A1* | 10/2015 | Gupta | H04W 72/0453 |
| | | | 370/237 |
| 2016/0007402 A1* | 1/2016 | Kim | H04W 72/0406 |
| | | | 370/252 |
| 2017/0223601 A1* | 8/2017 | Egner | H04W 4/029 |
| 2017/0353213 A1* | 12/2017 | Yuan | H04B 1/707 |
| 2018/0124784 A1* | 5/2018 | Kumar | H04W 52/0206 |
| 2018/0192329 A1* | 7/2018 | Medapalli | H04L 1/0023 |
| 2018/0309476 A1* | 10/2018 | Hassan | H04B 1/7143 |
| 2019/0174497 A1* | 6/2019 | Wang | H04L 5/0094 |

OTHER PUBLICATIONS

C. J. Deepu et al., "A Hybrid Data Compression Scheme for Power Reduction in Wireless Sensors for IoT", IEEE Transactions on Biomedical Circuits and Systems, vol. 11, No. 2, Apr. 2017.

V. J. Kotagi et al., "Breathe to Save Energy: Assigning Downlink Transmit Power and Resource Blocks to LTE Enabled IoT Networks", IEEE Communications Letters, vol. 20, No. 8, Aug. 2016.

E. D. N. Ndil et al., "On Enhancing Technology Coexistence in the IoT Era: ZigBee and 802.11 Case", IEEE Access, vol. 4, Apr. 2016.

W. Wang et al., "Sampleless Wi-Fi: Bringing Low Power to Wi-Fi Communications", IEEE/ACM Transactions on Networking, vol. 25, No. 3, Jun. 2017.

M. A. El-Razed et al., "Dynamic Power Reduction of Microprocessors for IoT Applications", 2016 28th IEEE International Conference on Microelectronics (ICM), Dec. 2016.

N. Yee et al., "Multi-Carrier CDMA in Indoor Wireless Radio Networks", Proc. IEEE International Symposium on Personal, Indoorand Mobile Radio Communications, Sep. 1993.

V. DaSilva et al., "Performance of Orthogonal CDMA Codes for Quasi-Synchronous Communication Systems", Proceedings of 2nd IEEE International Conference on Universal Personal Communications, Oct. 1993.

S. Kaiser et al., "A Spread-Spectrum Multi-Carrier Multiple-Access System for Mobile Communications", Proceedings of International Workshop on Multi-Carrier Spread Spectrum, Apr. 1997.

K. Lee et al., "Multi Rate Adaptive Cluster Spreading OFDMA System", 2008 3rd International Conference on Convergence and Hybrid Information Technology, Nov. 2008.

L. Vandendorpe, "Multitone Spread Spectrum Multiple Access Communications System in a Multipath Rician Fading Channel", IEEE Transactions on Vehicular Technology, vol. 44, Issue 2, May 1995.

D-M. Chuang et al., "Multi-carrier CDMA Communications System Design", EE382C Spring 1998.

IEEE, Standard IEEE Std P802.11ax.Part 11: Wireless LAN Medium Access Control (MAC) and Physical Layer (PHY) specifications: Enhancements for High Efficiency WLAN, Draft Standard, Feb. 2018.

L. Vandendorpe, "Multitone Spread Spectrum Multiple Access Communications System in a Multipath Rician Fading Channel", IEEE Transactions on Vehicular Technology, vol. 44, No. 2, May 1995.

* cited by examiner

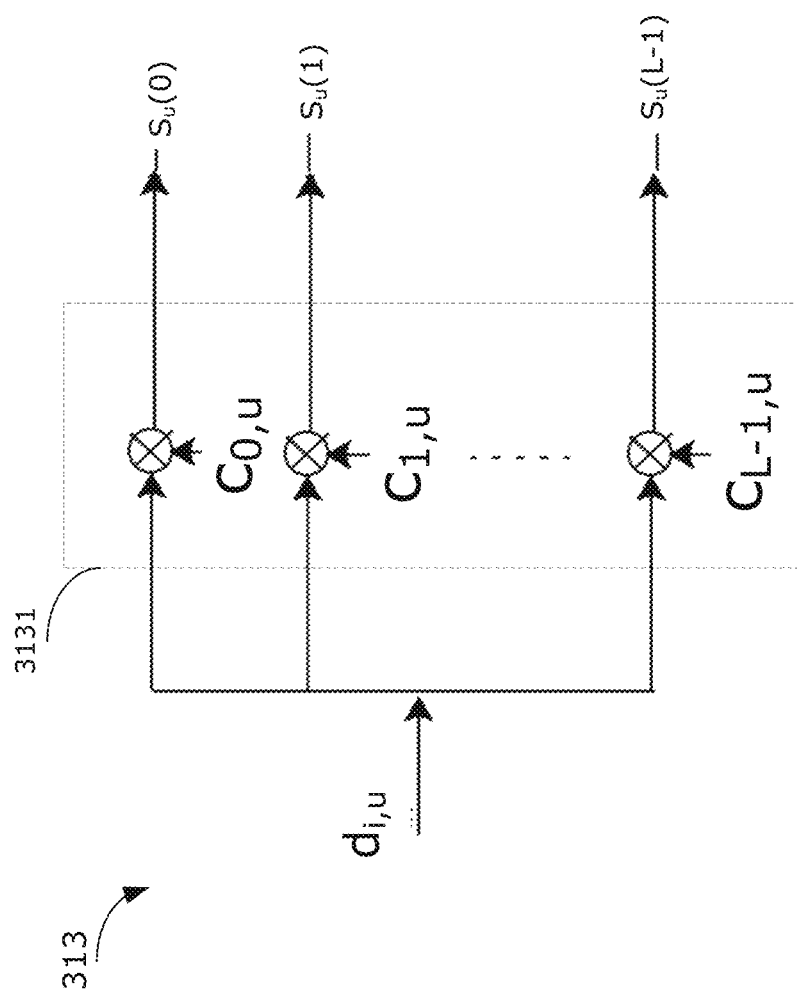

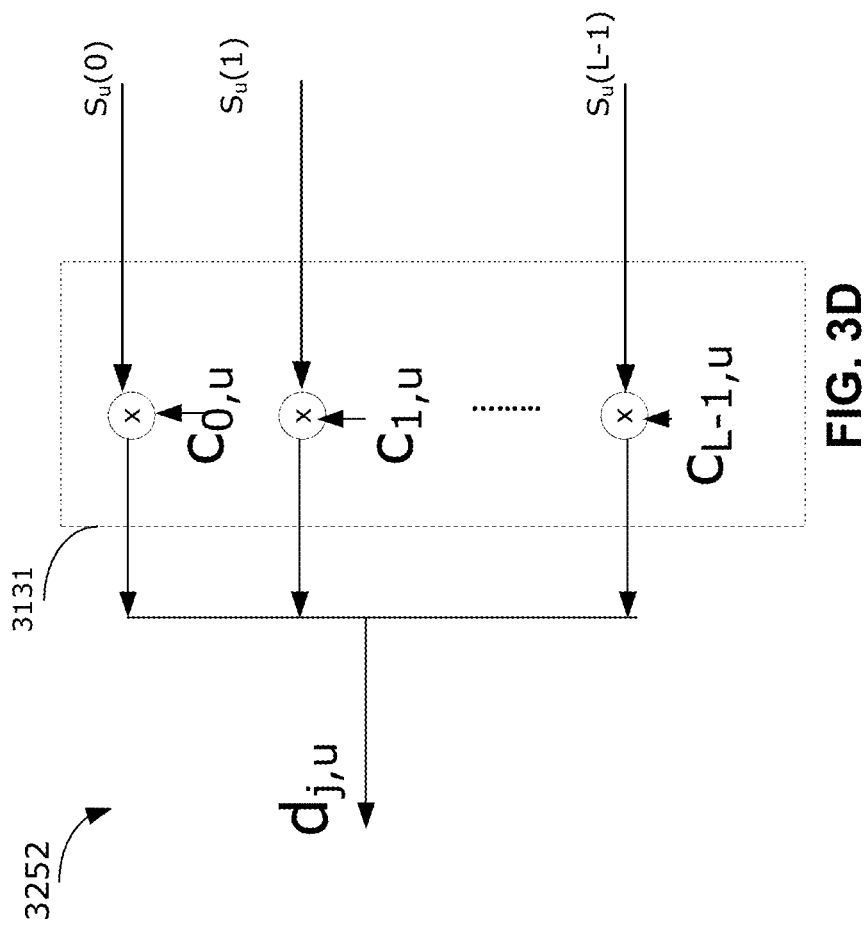

DYNAMIC SPECTRUM SPREADING OF DATA SYMBOLS FOR MULTIPLE ACCESS TRANSMISSION

TECHNICAL FIELD

The present disclosure relates to wireless communications, in particular methods and systems for dynamic spectrum spreading for multiple access transmission in a wireless local area network (WLAN).

BACKGROUND

Various recent wireless communication technologies are used for providing multiple devices with access to services and network connectivity. The Institute of Electrical and Electronics Engineers (IEEE) sets standards for wireless communication technologies, such as wireless local area network (WLAN) communication technologies. The IEEE 802.11 family of standards relate to WLANs and their quality of service (QoS), access point protocol, security enhancement, wireless management, etc.

A new proposed IEEE 802.11 WLAN standard is high efficiency wireless (HEW), that seeks to improve WLAN performance to better support a variety of applications such as video, cloud access, and offloading in diverse and ultra-dense environments.

WLANs and Internet-of-Things (IoT) technology often involve the use of battery-powered devices that have limited power capacity. Wireless communication systems often include devices which have limited power capacity, have heterogeneous access demand, and may be required to operate in ultra-dense wireless communication networks. However, the limited power, heterogeneous access demand, and ultra-dense deployment pose various challenges in wireless communication networks, and especially for IoT technology. For example, it is often desired to operate the battery-powered devices for a long duration without frequent battery charging or replacement. In particular, when coin cell batteries are used, the coin cell batteries have negative impact on peak power consumption as battery capacity is used. Further, the heterogeneous access demand and the ultra-dense environment mean that there are a large number of devices having diverse transmission demands in wireless communication network, which may lead to slower data rates and inefficient spectrum utilization.

Accordingly, it would be desirable to provide a solution for improving power efficiency and diversify data rate options in wireless communication systems.

Accordingly, it would be desirable to provide a solution for managing power output from battery-power devices that have limited power capacity.

SUMMARY

The present disclosure describes example methods and systems to enable payload data to be spread over a number of sub-carriers for wireless transmissions between Access Points (AP) and stations (STA) in a WLAN. The AP receives each STA's status information, and controls an amount of spreading of the payload data that can flexibly take into account the desired amount of peak power consumption, the required data rate, and the channel conditions. Based on these factors, the AP determines a number of sub-carriers for each STA that will be used to carry the spread payload data. Example embodiments can address high power peak consumption, data rate inflexibility and inefficient spectrum communication as found in conventional wireless systems.

An example embodiment is a method performed by an access point (AP), the method includes: receiving, from a station (STA), status information of the STA including power status information of the STA; and transmitting to the STA resource allocation information for a transmission by the STA in one or more resource units (RUs), the resource allocation information including a number of sub-carriers of the one or more RUs for spreading of payload data of the STA, the number of subcarriers being determined based on the power status information of the STA.

In another example embodiment of the method, the method further includes comprising receiving the transmission from the STA that includes the payload data spread over the one or more RUs.

In another example embodiment of any of the above methods, the power status information of the STA includes remaining battery capacity of the STA, the number of sub-carriers for spreading of the payload data being determined based on the remaining battery capacity.

In another example embodiment of any of the above methods, the method further includes determining a maximum peak power consumption value of the transmission or a maximum Peak-To-Average Power Ratio (PAPR) value of the transmission from the remaining battery capacity of the STA, the number being determined by the AP such that transmitted power of the STA does not exceed the maximum peak power consumption value or the maximum Peak-To-Average Power Ratio (PAPR) value.

In another example embodiment of any of the above methods, the method further includes determining network status information that includes required data rate or channel condition, the number of sub-carriers being determined based on the required data rate or the channel condition.

In another example embodiment of any of the above methods, the resource allocation information includes identification of one or more spreading sequences for the spreading of the payload data of the STA.

In another example embodiment of any of the above methods, a respective length of each of the one or more spreading sequences is equal to the number of sub-carriers.

In another example embodiment of any of the above methods, the resource allocation information is included within a control frame.

In another example embodiment of any of the above methods, the transmission is an uplink (UL) transmission, and wherein the control frame is a trigger frame for the uplink (UL) transmission, the method further includes: receiving the UL transmission from the STA that includes the payload data that was spread over the one or more RUs; and de-spreading the received payload data that was spread over the one or more RUs.

In another example embodiment of any of the above methods, the resource allocation information identifies a first spreading sequence for spreading first data symbols of the payload data of the STA, and the first spreading sequence is used for spreading each of the first data symbols of the STA into first spread data symbols; wherein the resource allocation information identifies a second spreading sequence that is orthogonal to the first spreading sequence, and the second spreading sequence is used for spreading each of a plurality of second data symbols into second spread data symbols; and wherein the first spread data symbols and the second spread data symbols are modulated over the one or more RUs.

In another example embodiment of any of the above methods, the transmission is a multi-user (MU) transmission by multiple STAs including a first STA and a second STA, wherein, for the MU transmission, the resource allocation information identifies a first spreading sequence for spreading of first data symbols of first payload data of the first STA, and the first spreading sequence is used for spreading each first data symbol into first spread data symbols; wherein, for the MU transmission, the resource allocation information identifies a second spreading sequence that is orthogonal to the first spreading sequence, and the second spreading sequence is used for spreading of second data symbols of second payload data of the second STA into second spread data symbols; and wherein the first spread data symbols and the second spread data symbols are modulated over the number of sub-carriers.

In another example embodiment of any of the above methods, the transmission is a multi-user (MU) transmission by multiple STAs including a first STA and a second STA, wherein the number of sub-carriers are in one Resource Unit (RU), wherein, for the MU transmission, the resource allocation information identifies a first spreading sequence for spreading of first data symbols of first payload data of the STA, the first spreading sequence is used for spreading each of the first data symbols into first spread data symbols, and the first spread data symbols are modulated over a first plurality of sub-carriers in the RU; wherein, for the MU transmission, the resource allocation information identifies a second spreading sequence for spreading of second data symbols of second payload data of the second STA, the second spreading sequence is used for spreading each of the second data symbols into second spread data symbols, and the second spread data symbols are modulated over a second plurality of sub-carriers in the RU; and wherein the first plurality of sub-carriers is different than the second plurality of sub-carriers.

Another example embodiment is a method performed by a wireless communication device, the method including: modulating payload data from series of bits to data symbols; determining a number of sub-carriers of one or more resource units (RUs) to spread each data symbol, the number being based on network status information; spreading each data symbol into spread data symbols, a number of the spread data symbols for each data symbol being equal to the number of sub-carriers; for each data symbol, modulating each of that data symbol's spread data symbols over a different sub-carrier of the one or more RUs; and transmitting a transmission that includes the modulated spread data symbols over the sub-carriers of the one or more RUs.

In another example embodiment of the above method performed by the wireless communication device, wherein the number of sub-carriers is less than a maximum number of available sub-carriers defined by one of the RUs.

In another example embodiment of any of the above methods performed by the wireless communication device, the number of sub-carriers is dependent on a required peak power consumption value of the transmission, a required Peak-To-Average Power Ratio (PAPR) value of the transmission, a required data rate of the transmission, or channel condition.

In another example embodiment of any of the above methods performed by the wireless communication device, for a respective station (STA), the spreading comprises spreading each data symbol of the respective STA using a spreading sequence.

In another example embodiment of any of the above methods performed by the wireless communication device, a first spreading sequence for spreading first data symbols to first spread data symbols for a first STA is orthogonal with a second spreading sequence for spreading second data symbols to second spread data symbols for a second STA, the first spread data symbols and the second spread data symbols being modulated over the sub-carriers of the one or more RUs.

In another example embodiment of any of the above methods performed by the wireless communication device, the method further includes receiving the number of sub-carriers from another wireless communication device.

In another example embodiment of any of the above methods performed by the wireless communication device, the method further includes determining the number of sub-carriers based on the power status information of another wireless communication device.

Another example embodiment is a method performed by a station (STA), the method including: transmitting power status information of the STA to an Access Point (AP); receiving resource allocation information from the AP, the resource allocation information including a number of sub-carriers of one or more resource units (RUs) for spreading of payload data of the STA, the number being based on the power status information of the STA; and transmitting an uplink (UL) transmission to the AP that includes the payload data spread over the sub-carriers of the one or more RUs.

In another example embodiment of the above method performed by the STA, the method further includes: receiving, from the AP, a downlink (DL) transmission that includes the resource allocation information and the payload data spread over the sub-carriers of the one or more RUs; and de-spreading the payload data that was spread over the sub-carriers of the one or more RUs.

In another example embodiment of any of the above methods performed by the STA, the method further includes: modulating the payload data from series of bits to data symbols; spreading each data symbol into spread data symbols; for each data symbol, modulating each of that data symbol's spread data symbols over a different sub-carrier of the one or more RUs; and transmitting the modulated spread data symbols over the sub-carriers to the AP.

Another example embodiment is an Access Point (AP), including: a transmitter; and one or more controllers configured to: receive status information of the STA including power status information of the STA, and transmit to the STA resource allocation information for a transmission by the STA in one or more resource units (RUs), the resource allocation information including a number of sub-carriers of the one or more RUs for spreading of payload data of the STA, the number being determined based on the power status information of the STA.

Another example embodiment is a wireless communication device, including: a transmitter; and one or more controllers configured to: modulate payload data from series of bits to data symbols, determine a number of sub-carriers of one or more resource units (RUs) to spread each data symbol, spread each data symbol into spread data symbols, a number of the spread data symbols for each data symbol being equal to the number of sub-carriers, for each data symbol, modulate each of that data symbol's spread data symbols over a different sub-carrier of the one or more RUs, and transmit a transmission that includes the modulated spread data symbols over the sub-carriers of the one or more RUs.

BRIEF DESCRIPTION OF THE DRAWINGS

For a more complete understanding of the present invention, and the advantages thereof, reference is now made to the following description taken in conjunction with the accompanying drawings, in which:

FIG. 3B is a schematic diagram of an example signal spreading block of FIG. 3A;

FIG. 3D is a schematic diagram of an example signal de-spreading block of FIG. 3C;

Similar reference numerals may have been used in different figures to denote similar components.

DETAILED DESCRIPTION OF ILLUSTRATIVE EMBODIMENTS

In ultra-dense environments, such as a wireless corporate office, an outdoor hotspot, or a crowded residential setting, communications between an access point (AP, also known as an AP STA or a network coordinator) and stations (STAs, also known as non-AP STAs) may become overloaded by traffic due to inefficient spectrum utilization. As well, the STAs may have restrictions on peak power consumption due to limitations of their batteries. Methods and systems in accordance with example embodiments provide for spreading of payload data for uplink (UL) or downlink (DL) transmissions in a wireless local area network (WLAN) to improve spectral efficiency and link reliability, and provide flexible options for peak power consumption, transmission data rate, and channel conditions.

Figure 1A:
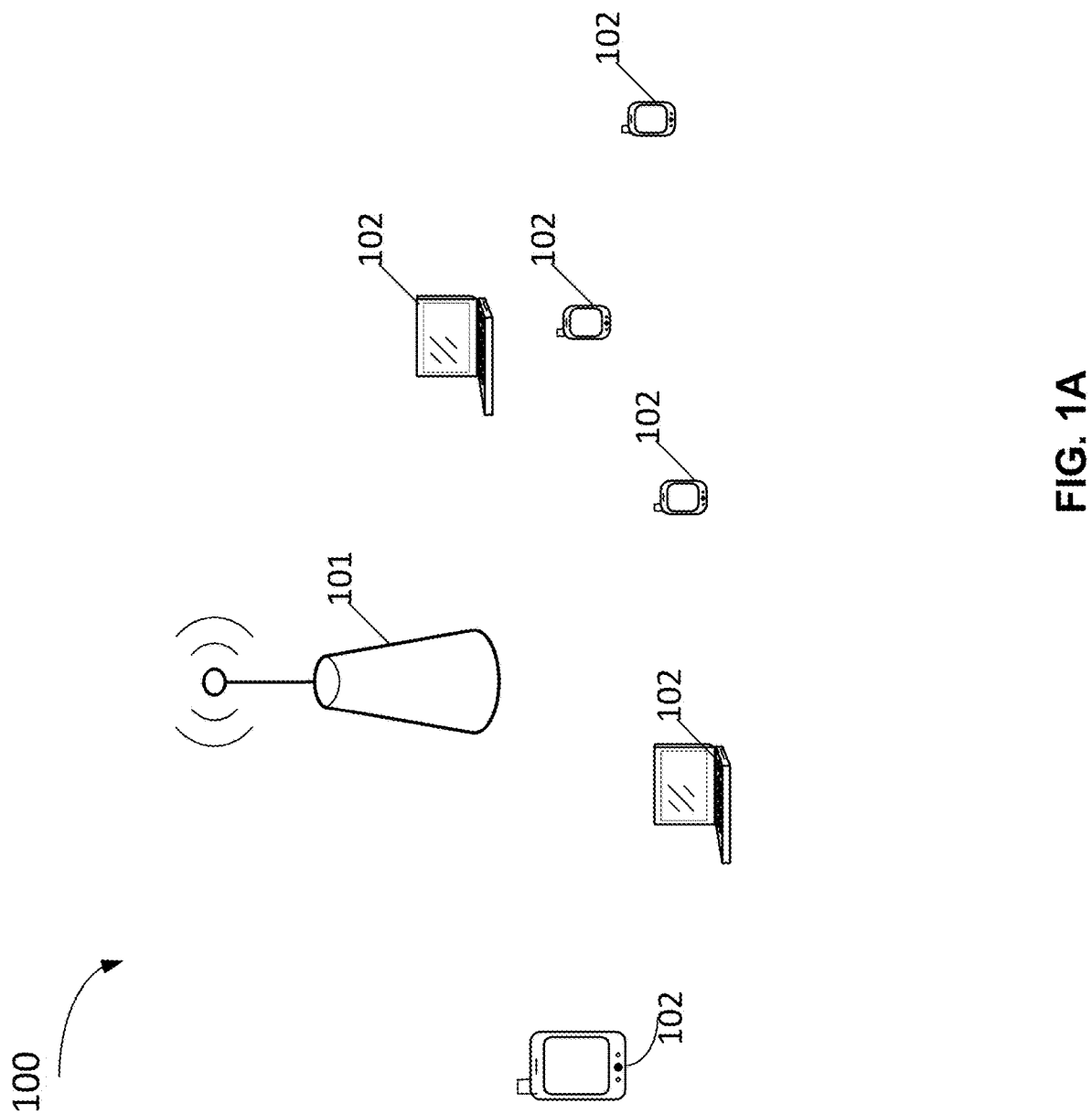
FIG. 1A is a schematic diagram illustrating a wireless communication system according to example embodiments.

FIG. 1A provides an example schematic diagram of a wireless communication system 100 in which example embodiments may be implemented. The wireless communication system 100 includes an AP 101 and at least one STA 102 in a wireless communication network, such as a WLAN. The AP 101 is any entity that has STA functionality and provides access to the Internet or a distribution service for the associated STAs 102. The STAs 102 may be mobile communication devices enabled for wireless communications, including but not limited to mobile phones, smart phones, laptops, tablet computers, machine-type communication devices, Internet of Things (IoT) devices, and wireless sensing and reporting devices.

Figure 5:
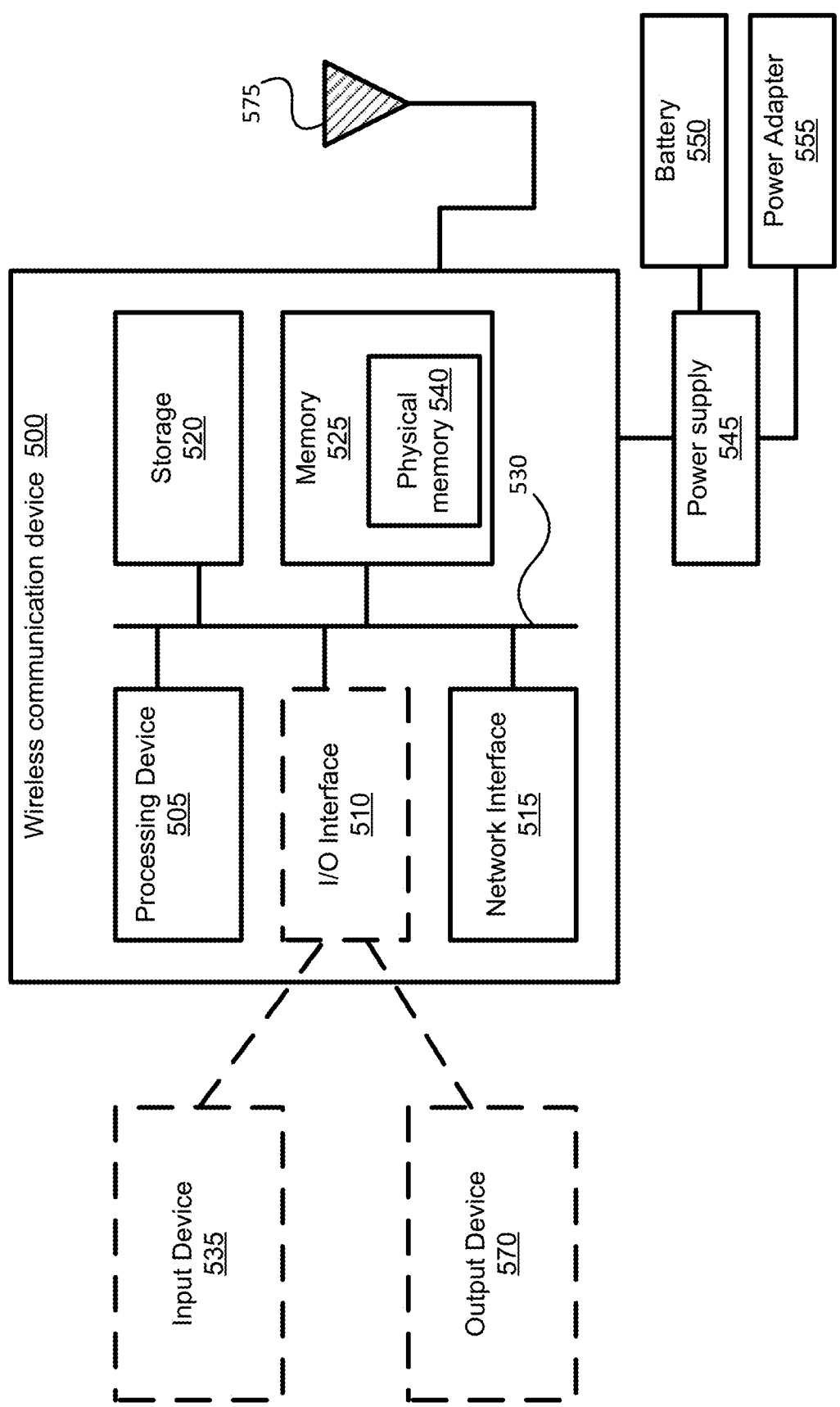
FIG. 5 is a schematic representation of an example wireless communication device according to example embodiments.

Each STA 102 can include a portable power supply such as a battery 550 (FIG. 5). The battery 550 has a maximum battery capacity (maximum power capacity). When used to power the respective STA 102, the battery 550 loses energy and has a remaining battery capacity (remaining power capacity). In some types of batteries such as disc batteries, a lower remaining battery capacity results in lower peak power transmission capability. If the instant power drawn from the battery 550 is higher than a power limit of the battery 550, the battery 550 may be damaged.

In the WLAN, the AP 101 may provide access to the Internet or a distribution service for one or more STAs 102 that are wirelessly and communicatively associated with the AP 101. The AP 101 can access the Internet or the distribution service by way of wired or wireless communication. Although only one single AP 101 is shown, this is only illustrative and is not intended to be limiting. In other examples, there may be more than one AP 101 within the wireless communication system 100.

Figure 1B:
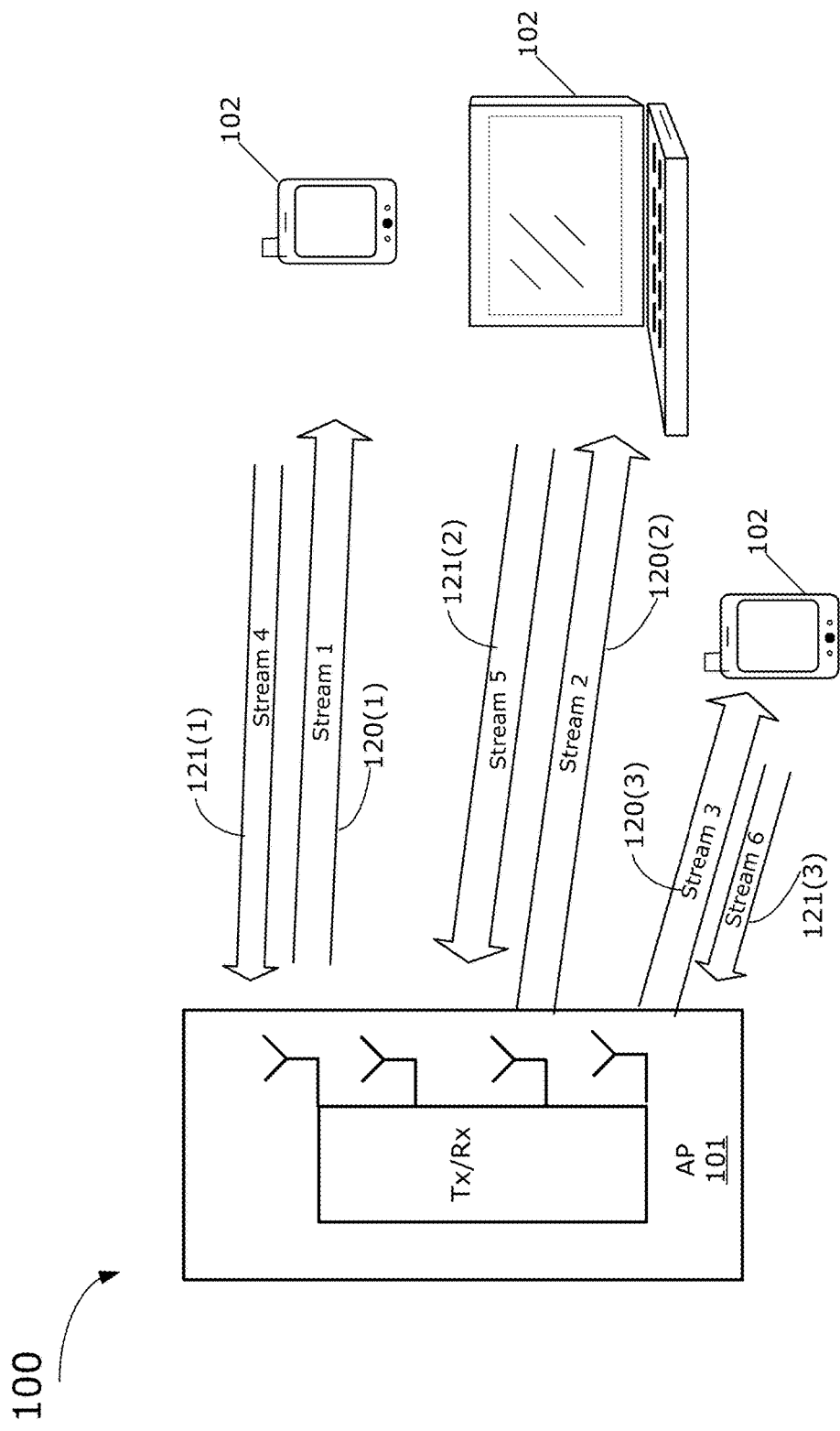
FIG. 1B is a schematic diagram of a MU-MIMO WLAN for downlink (DL) and uplink (UL) multiple access communications according to example embodiments.

Referring to FIG. 1B, examples of the WLAN will be described in the context of wireless communications between a plurality of STAs 102 and an AP 101. The wireless communication system 100 supports multi-user multiple input multiple output (MU-MIMO) transmissions, also known as a multiple access transmissions. MU-MIMO based transmission, which can use multiple antennas, allows simultaneous channel access by the STAs 102 for effective use of channels in the WLAN. The AP 101 can simultaneously transmit spatial-multiplexed data to the STAs 102. Payload data can be simultaneously transmitted by the AP 101 to the STAs 102 using a plurality of respective spatial streams (stream 1, 2, 3 shown in FIG. 1B) in the DL direction, shown as DL MU transmissions 120(1) to 120(3) (generically referred to as DL MU transmission 120). In the DL direction, payload data transmitted to each STA 102 may be different for each STA 102. In the UL direction, payload data can be simultaneously transmitted to the AP 101 using a plurality of respective spatial streams (stream 4, 5, 6 shown in FIG. 1B), shown as UL MU transmissions 121(1) to 121(3) (generically referred to as UL MU transmission 121). The DL MU transmissions 120 and the UL MU transmissions 121 are payload transmissions. The DL MU transmissions 120 and the UL MU transmissions 121 may use Orthogonal Frequency Division Multiple Access (OFDMA), with MU-MIMO or without MU-MIMO.

Figure 2A:
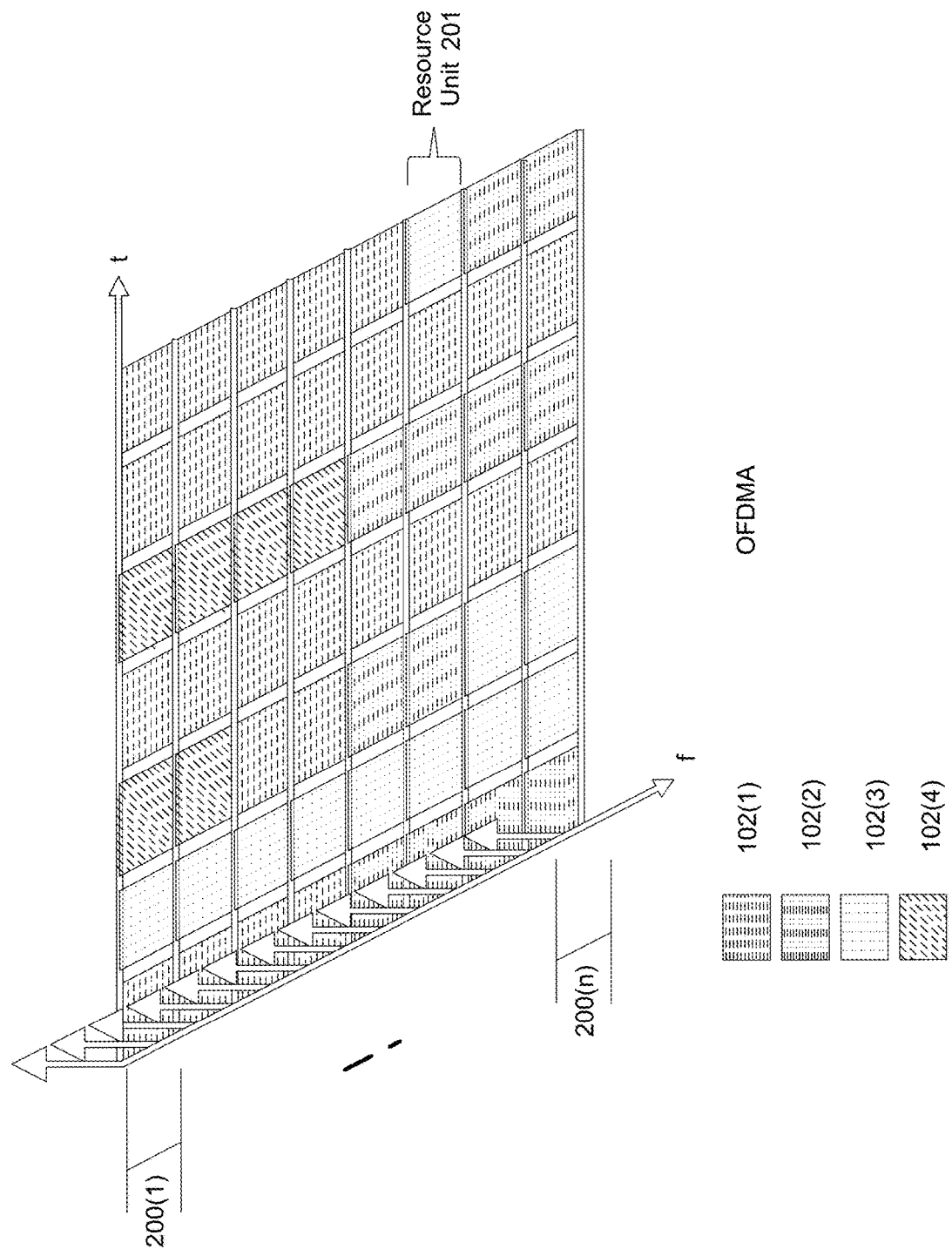
FIG. 2A illustrates a graph of resource units for multiple access communications, according to example embodiments.

Reference is now made to FIG. 2A, which illustrates an OFDMA transmission scheme to multiplex communications with a plurality of STAs 102 over different frequencies (f) and times (t). The OFDMA is a multiple access scheme where different subsets of sub-carriers are allocated to different STAs 102, allowing the AP 101 to have data communication with the different STAs 102 (e.g., STAs 102(1) to 102(4) as shown in FIG. 2A). The STAs 102 can have data transmission scheduled across both frequency (such as sub-carriers 200(1) to 200(n) (generically referred to as sub-carrier 200) and time. As shown in FIG. 2A, transmission channels are divided into smaller sub-channels with a predefined number of sub-carriers. A Resource Unit (RU) 201 includes a plurality of sub-carriers, typically with a minimum size of 26 sub-carriers 200. The RU 201 has a maximum number of sub-carriers that can be used by one or more of the STAs 102. The AP 101 can assign each STA 102 one or more RUs in order to perform a UL or DL transmission, or can assign multiple STAs 102 to a RU.

Conventional rate adaptation algorithms mainly select data rate according to only channel conditions, which does not consider factors such as the power status of the STAs. Some other conventional technologies, such as compression, optimized power allocation, dual protocol approach and under-sampled reception may improve transmission rate, however, these conventional technologies do not consider the power status of battery-powered STAs.

Some conventional approaches apply spreading sequences to implement conventional spread-spectrum multi-carrier multiple access, including multi-carrier code-division multiples access (MC-CDMA), multi-carrier direct-sequence code-division multiple access (MC-DS-CDMA), orthogonal frequency division multiple access (OFDMA) with code division multiplexing (CDM) and multi-rate multiple access spreading OFDMA. However, the conventional multi-carrier multiple access schemes may lead to waste of bandwidth and can lead to higher peak-to-average-power ratios (PAPR). Moreover, when such multi-carrier multiple access communication systems are operating in a real channel environment to provide different services for different devices, efficiency of bandwidth utilization and power efficiency may degrade significantly. Further, some multiple access communication systems have spreading of payload data over the maximum number of sub-carriers in a RU, which is inflexible and does not allow varying of data rate and power consumption by controlling the number of sub-carriers to spread the payload data.

Example embodiments of methods and systems, as described herein, can improve power efficiency and provide flexible data rate options to support multiple access communication in ultra-dense environments, and can address at least some drawbacks of the above-discussed conventional approaches. In various example embodiments, one RU can be shared by multiple STAs. In various example embodiments, the battery status of the STAs is used to determine an amount of spreading of payload data over the sub-carriers of the RU.

Figure 2B:
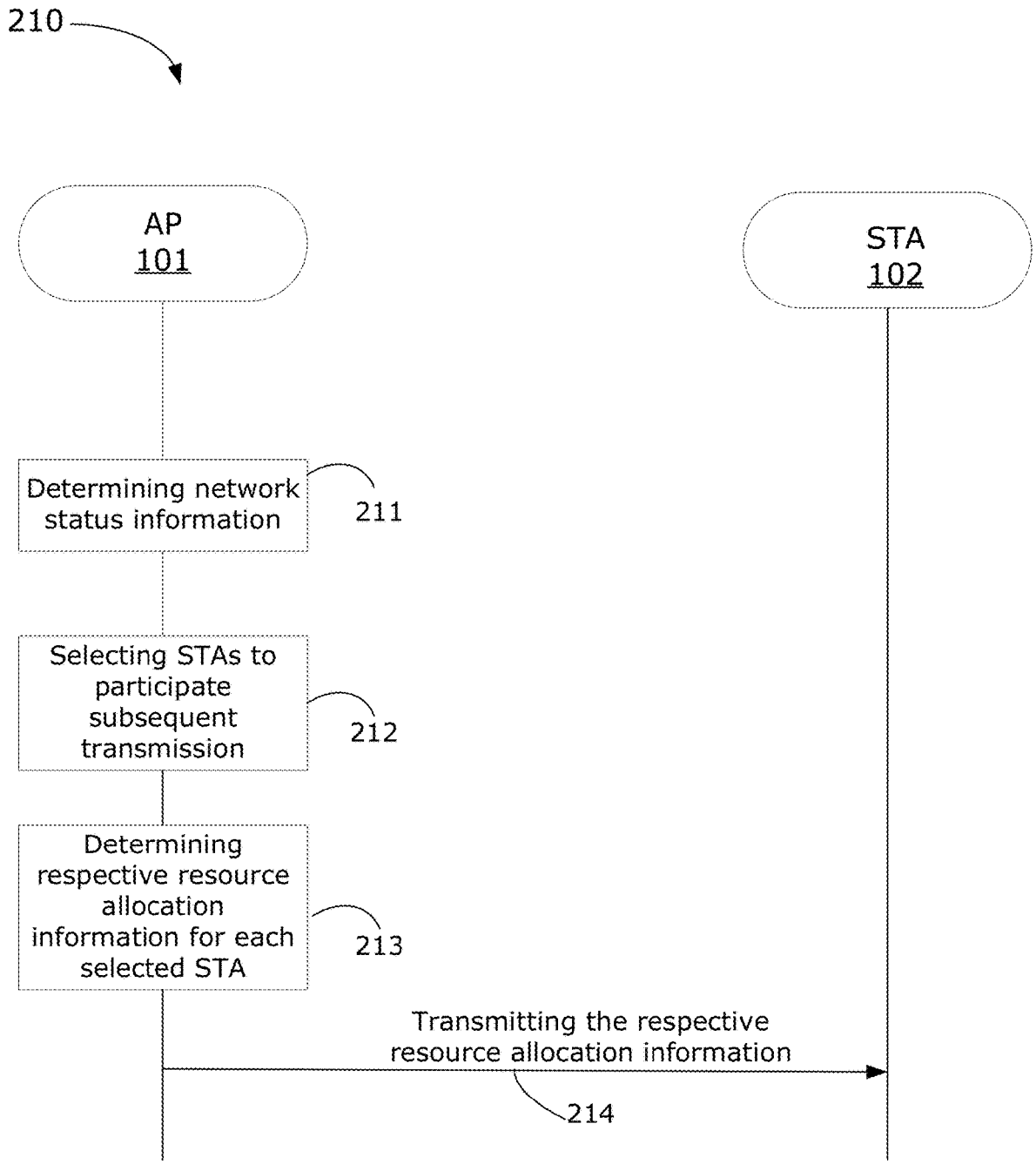
FIG. 2B illustrates an example method for resource allocation scheduling of a transmission in the wireless communication system according to example embodiments.

FIG. 2B shows a resource allocation scheduling method 210 performed by the AP 101 for multiple access communications, in accordance with an example embodiment. The resource allocation scheduling method 210 is for the wireless communication system 100, which can be an OFDMA based WLAN. The resource allocation scheduling method 210 can be used for a DL MU transmission or a UL MU transmission, in order to transmit payload data to or from the STA 102, respectively. The resource allocation scheduling method 210 is used to allocate available resources for the UL MU transmission or DL MU transmission, in order to mitigate collision of transmission, optimize resource allocation, and reduce peak power consumption. For ease of illustration, only one single STA 102 is illustrated in the FIG. 2B to implement the resource allocation scheduling method 210. In other examples, a plurality of STAs 102 associated with the AP 101 within the wireless communication system 100 may participate in the resource allocation scheduling method 210.

At step 211, the AP 101 determines network status information. The AP 101 receives status information from each STA 102 to determine the network status information. The network status information may include each associated STA's status information, each channel's condition, which STAs 102 are soliciting for a transmission, and the payload data size of each STA 102. In some examples, each STA 102 determines its own status information, and reports its status information to the AP 101. The status information from each STA 102 can include power status information of that STA 102, access demand, channel state information (CSI), amount of payload data to be transmitted, and so on.

At step 212, after the AP 101 has an overall view of the network status information of the WLAN, the AP 101 selects which STAs 102 will participate in the transmission, such as a UL MU transmission or a DL MU transmission.

At step 213, the AP 101 determines respective resource allocation information for each of the selected STAs 102. The resource allocation information includes time and frequency resource allocation for each selected STA 102, and optionally spatial resource allocation. The resource allocation information for each selected STA 102 identifies a number of sub-carriers of one or more RUs for spreading payload data of the selected STA 102. The number is determined by the AP 101 in dependence of the power status information of the selected STA 102, the required data rate, and the channel conditions, as described further herein. The number of sub-carriers to spread the payload data is therefore determined by the AP 101, and can be changed based on updated status information from the STAs 102. Spreading of the payload data over the number of sub-carriers results in a lowering of the transmission spectral power density (e.g. watts per hertz or per sub-carrier), as compared to no spreading. Spreading over a higher number of sub-carriers results in further lowering of the transmission spectral power density. The number of sub-carriers to spread the payload data is therefore inversely proportional to the transmission spectral power density.

In some examples, the resource allocation information may include an identification of one or more spreading sequences that are to be used for spreading of the payload data. The spreading sequence can be, for example: a Pseudo-random Noise (PN) sequence; a spreading sequence that is part of an orthogonal set of spreading sequences (or having cross-correlation equal or close to zero) such as a Walsh-Hadamard sequence or a Zadoff-Chu sequence; or other suitable types of spreading sequences in other examples. The particular spreading sequence(s) to be used can be flexibly determined by the AP 101 based on the network status information, taking into consideration power status information of the selected STA, access demand, channel state information (CSI), and amount of payload data to be transmitted. In an example embodiment, as described in greater detail herein, the spreading of the payload data includes spreading individual data symbols of the payload data into a plurality of spread data symbols using a spreading sequence, and modulating each of that data symbol's spread data symbols over a different sub-carrier.

At step 214, the AP 101 transmits the respective determined resource allocation information to each of the selected STAs 102 within a control frame. For UL transmission, the control frame is a trigger frame. For DL transmission, the control frame is a DL multi-user (MU) frame. The DL multi-user (MU) frame can be a DL high efficiency (HE) multi-user (MU) Physical Layer Convergence Procedure (PLCP) Protocol Data Unit (PPDU) frame. In some examples, in the DL direction, the respective resource allocation information for each associated STAs 102 may be included within one single DL MU frame that is transmitted from the AP 101 to the associated or selected STAs 102. The respective resource allocation information includes the number of sub-carriers to spread payload data, and the identification of the spreading sequence. The AP 101 flexibly determines the number of sub-carriers to spread the payload data.

In some examples, at periodic intervals or after each transmission of payload data, the AP 101 determines network status information in order to have up-to-date status information of each STA 102. By having up-to-date network status information, the AP 101 is able to determine the most suitable resource allocation. The AP 101 can allocate respective resource allocation for spreading of payload data of each STA 102 based on that STA's power status information (e.g., remaining battery capacity), the required data rate and the channel conditions. The amount of spreading used therefore flexibly accounts for these conditions, and can be used to lower peak power consumption. The resource allocation information includes the number of sub-carriers to spread payload data of each associated STA 102, in dependence of that STA's power status information, the required data rate and the channel conditions.

Figure 2C:
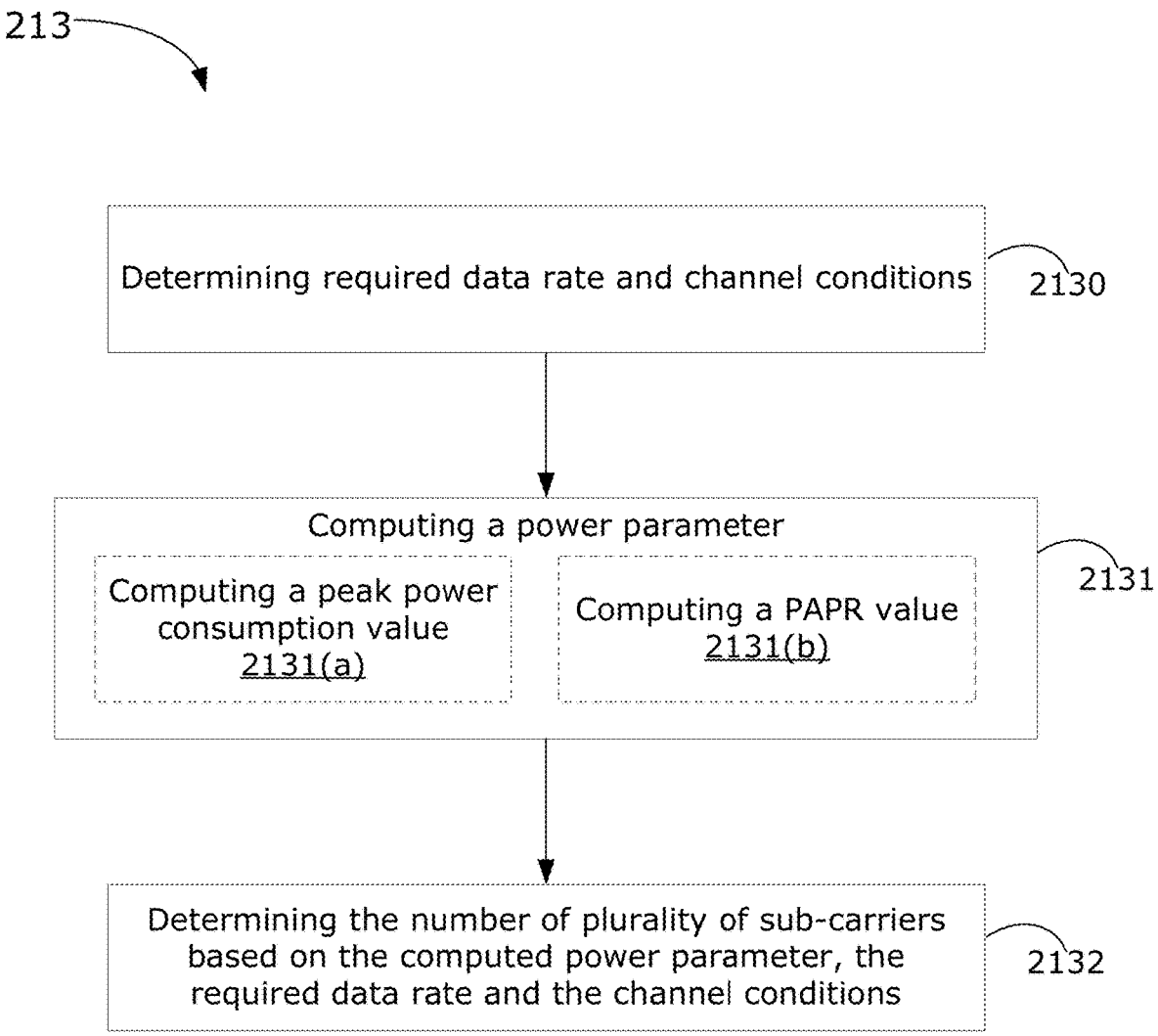
FIG. 2C illustrates an example method to determine resource allocation information for each STA in the wireless communication system according to example embodiments.

FIG. 2C illustrates a method 213 for the AP 101 to determine the number of sub-carriers for spreading payload data of each associated STA 102, in order to reduce peak transmission power consumption. At step 2130, the AP 101 determines, using the network status information from step 211, the required data rate and the channel conditions. The required data rate is based on the amount of payload data per STA 102 to be transmitted, the number of STAs 102 to participate in the transmission, and other factors. The required data rate can also be based on the overall amount of payload data to be transmitted to all of the selected or associated STAs 102 on the available channels.

At step 2131, the AP 101 computes a desired power parameter from the power status information of the STA 102. The computed power parameter may be, for example, a desired peak power consumption value, or a desired PAPR value. The step 2131 can include step 2131(*a*) or step 2131(*b*). In some examples, the computed power parameter can be a maximum value that is not to be exceeded by the output transmission power of the spread payload data. In some examples, the computed power parameter is a desired value to be attained within a tolerance. In some examples, the AP 101 computes both the maximum power parameter value as well as a desired power parameter value to be attained within a tolerance, and are both used by the AP 101 as factors for determining the number of sub-carriers for spreading.

In an example, at step 2131(*a*), after the AP 101 receives power status information about the remaining battery capacity of the STA 102, the AP 101 computes the desired peak power consumption value for the transmission by the STA 102 based on the remaining battery capacity of the STA 102. The computation can, for example, be done using a lookup table, an equation, or a function. The computed peak power consumption value can be proportional to the remaining battery capacity, in which case the computed peak power consumption value is lower when the remaining battery capacity is lower. Similarly, the computed peak power consumption value can be higher when the remaining battery capacity is higher.

In an example, at step 2131(*b*), after the AP 101 receives power status information about the remaining battery capacity of the STA 102, the AP 101 computes the desired PAPR value for the communication with the STA 102 based on the remaining battery capacity. The computation can, for example, be done using a lookup table, an equation, or a function. The computed PAPR value can be proportional to the remaining battery capacity, in which case the computed PAPR value is lower when the remaining battery capacity is lower. Similarly, the computed PAPR value can be higher when the remaining battery capacity is higher.

At step 2132, the AP 101 determines the number of sub-carriers to spread the data symbols based on the computed power parameter, the required data rate and the channel conditions. The number of sub-carriers to spread the payload data is inversely proportional to the transmission spectral power density. From step 2131, the AP 101 had computed the desired peak power consumption value of the transmission in dependence on the received remaining battery capacity of the STA 102. The AP 101 determines the number of sub-carriers (for spreading of the data symbols) that results in a peak transmission power that does not exceed the peak power consumption value. The AP 101 can, for example, use a look up table that has a mapping relationship between a peak power consumption value and a number of sub-carriers for spreading payload data. In other examples, equations, calculations, functions or simulations are used to determine the number of sub-carriers that result in the peak power consumption value. In one example, a simulation can be run by the AP 101 to test one number of sub-carriers to spread the payload data, determine the resultant peak transmission power value when spreading the payload data over that number of sub-carriers, and adjust the number of sub-carriers until the desired peak transmission power value is satisfied.

At step 2132, in some other examples, the AP 101 determines the number of sub-carriers to spread the data symbols based on the computed PAPR value (in dB or some other suitable unit), rather than the computed peak power consumption value, in a similar fashion. The AP 101 determines the number of the sub-carriers for spreading of the payload data for the transmission that would not exceed the computed PAPR value.

In some examples, both the computed desired PAPR value and the computed desired peak power consumption value are used for determining the number of sub-carriers for spreading of the payload data.

In example embodiments, the determination of the number of sub-carriers to spread the payload data is also made by the AP 101 in accordance with the required data rate and the channel availability. The number of sub-carriers to spread the payload data can be computed so that the transmission is within a threshold of the required data rate in some examples, or so that the data rate of the transmission exceeds a minimum required data rate in other examples. Note that the resultant power consumption of the transmission still needs to satisfy the computed desired power parameter at step 2131, in example embodiments.

In an example, less than all sub-channels in a RU can be used for spreading of one set of payload data of the STA 102. Spreading of the payload data over less than all sub-channels of the RU uses less network resources, but results in higher transmission spectral power density, than when compared to spreading over all of the sub-channels in the RU. The remaining sub-channels in the RU can therefore be used for spreading of other payload data. The remaining sub-channels in the RU for the STA 102 can be used for spreading of another set of payload data for the STA 102, or can be used for spreading payload data of a different STA 102. Usage of only part of the RU for one set of payload data therefore balances any increase of peak power consumption per sub-carrier with the benefit of using less network resources for that payload data. This increases data availability within the RU, when higher data rates are required. For example, the AP 101 can determine an equal number of the sub-channels in the RU to be used for spreading of different sets of payload data of the STA 102, such as half of the number of sub-channels for each two sets of payload data. In another example, the AP 101 can determine an equal or unequal number of the sub-channels in the RU to be used for spreading of payload data of one STA 102, and the remaining sub-channels can be used for a different STA 102.

In another example, an orthogonal set (or other suitable set) of spreading sequences can be used so that sub-channels can be re-used by the STA 102 for multiple sets of spread payload data, as described in greater detail herein. This increases data availability within the RU, when higher data rates are required for the transmission.

In another example, the AP 101 determines a resource allocation (including the number of the sub-channels for spreading) that both divides the number of sub-carriers in a RU to different STAs 102, and identifies an orthogonal set of spreading sequences so that a STA 102 can use allocated sub-channels for spreading of multiple sets of payload data.

In some examples, the STA 102 may compute the desired power parameter (peak power consumption value or the PAPR value) by itself, based on its own remaining battery capacity, and transmit the desired peak power consumption value or the PAPR value within the power status information to the AP 101. The AP 101 then determines the number of sub-carriers for spreading of payload data based on the peak power consumption value or the PAPR value that was received from the STA 102.

In some examples, the power status information transmitted by the STA 102 may indicate that STA 102 is currently at maximum battery capacity, or that the STA 102 is plugged into another power source using power adapter 555 (FIG. 5). In such a case, the AP 101 may compute the maximum power parameter value (peak power consumption value or the PAPR value) to be near infinity or some maximum value. In another example, when the STA 102 is currently at maximum battery capacity, the AP 101 may transmit to the STA 102 that no spreading is required, or that some other default spreading method is to be used.

By using the network status information of the STAs 102, the AP 101 can determine the number of sub-carriers to spread payload data of the STA 102. In example embodiments, the number of sub-carriers to be used corresponds to the length of the spreading sequence that is used to spread the payload data. Such approaches may help to dynamically achieve a required data rate and required transmission power consumption.

Figure 2D:
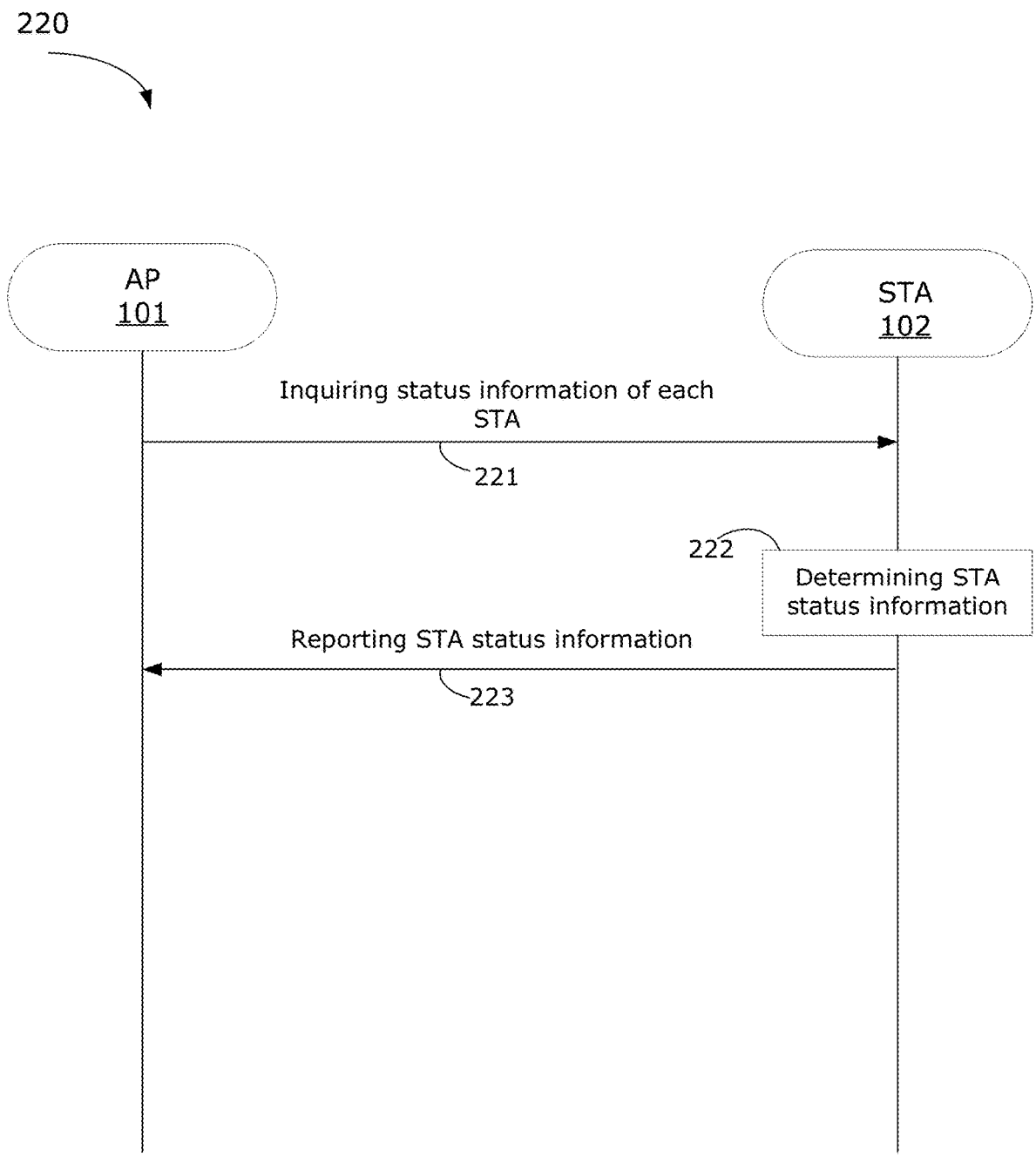
FIGS. 2D and 2E collectively illustrate an example method to report each STA's status information to the AP according to an example embodiment.
Figure 2E:
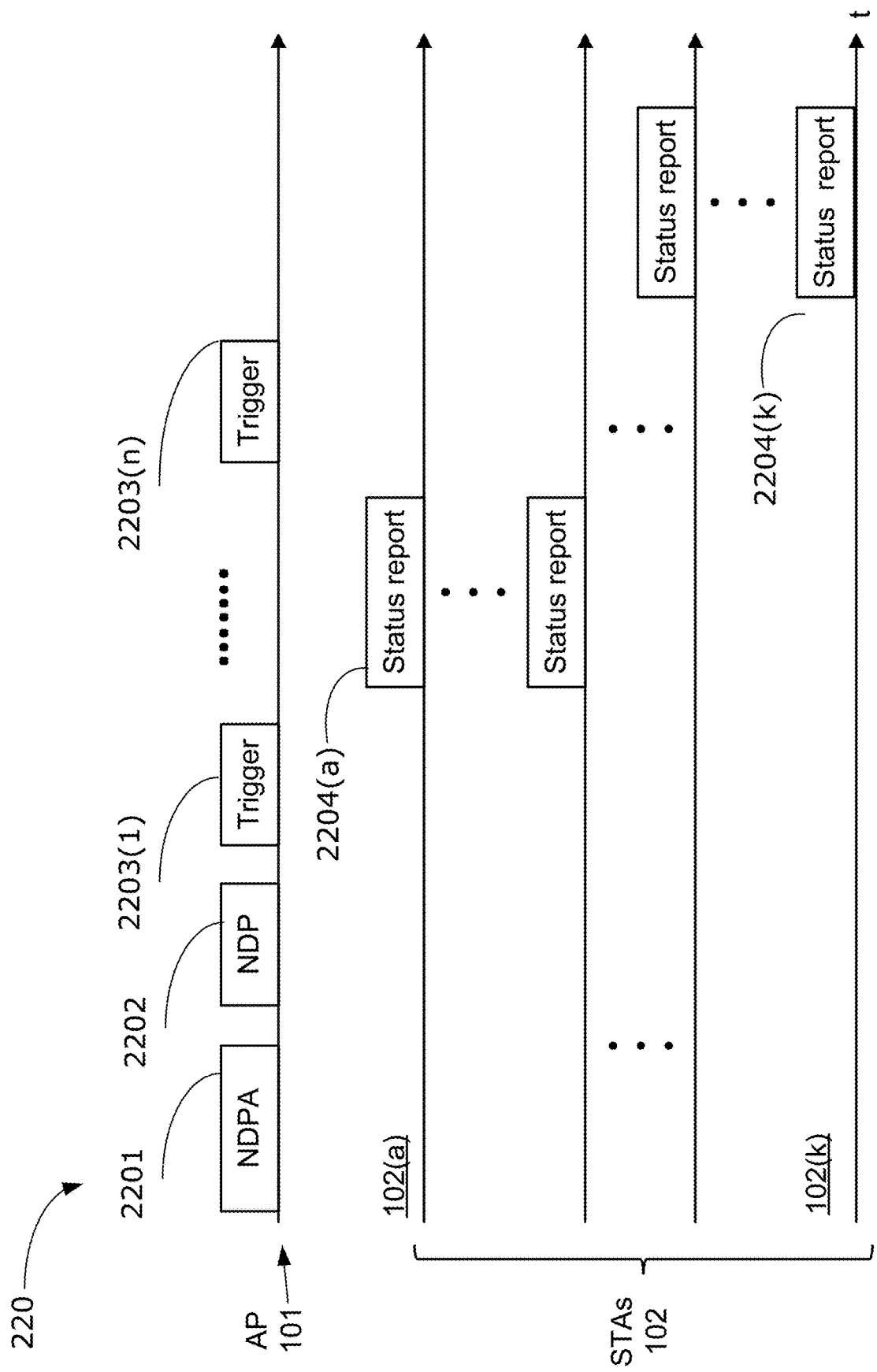

Referring again to step 211 (FIG. 2B), in order for the AP 101 to determine network status information, the AP 101 receives status information from each STA 102, which is illustrated in FIGS. 2D to 2G. FIG. 2D shows an example method 220 that illustrates how each STA 102 reports status information to the AP 101 to determine network status information for a DL transmission. FIG. 2E illustrates different frames which are transmitted between the AP 101 and each STA 102 to implement the method 220. In the method 220, each associated STA 102 reports their status information to the AP 101.

At step 221 of FIG. 2D, the AP 101 requests status information from each associated STA 102. An associated STA 102 refers to a STA 102 that is associated with the AP 101 within one basic service set (BSS). A selected STA 102 refers to a STA 102 that is selected by the AP 101 for a transmission. The process of inquiry is shown in FIG. 2E for the DL direction, in which the AP 101 transmits a null data packet announcement (NDPA) fame 2201 to the STAs 102. In some other examples, the AP 101 may skip step 212, and does not select which STAs 102 are to take part in the transmission, rather, the AP 101 may identify all of the associated STAs 102 within the BSS to participate in the transmission.

At step 222, each STA 102 determines its own status information. The status information of each STA 102 includes the power status information (e.g., remaining battery capacity) of the STA 102, the CSI, the amount of payload data to be transmitted (if applicable), and other information. As shown in FIG. 2E, the STAs 102(a), ..., 102(k) are selected by the AP 101 to participate in the DL transmission. The selected STAs 102 estimate the CSI in each DL channel using the received NDP frame 2202 that follows the NDPA frame 2201, and also determine their respective current status information.

At step 223, each selected STA 102 reports its status information in response to the inquiry. The AP 101 transmits trigger frames 2203(1) to 2203(n) to poll each selected STA 102. After the selected STAs 102 determine their status information, each selected STA 102 may transmit a respective status report frame 2204(a) to 2204(k) to the AP 101 upon being polled.

In this example, in order to perform the DL transmission, the AP 101 sends inquiries to each selected STA 102 for their status information. The selected STAs 102 report their respective status information to the AP 101, which allows the AP 101 to have an updated overall view of each STA's status information.

Figure 2F:
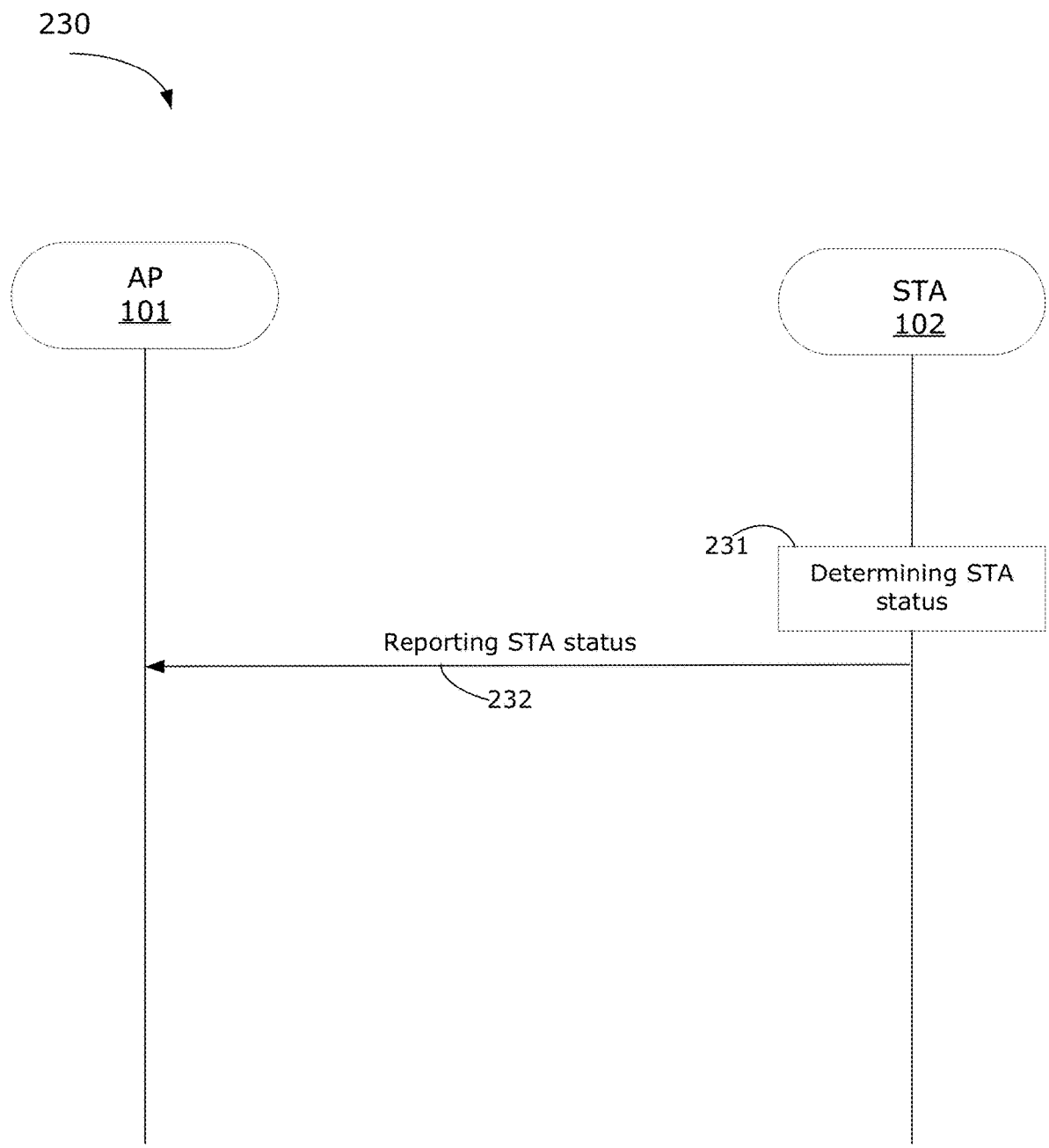
FIGS. 2F and 2G collectively illustrate another example method to report each STA's status information to the AP according to another example embodiment.
Figure 2G:
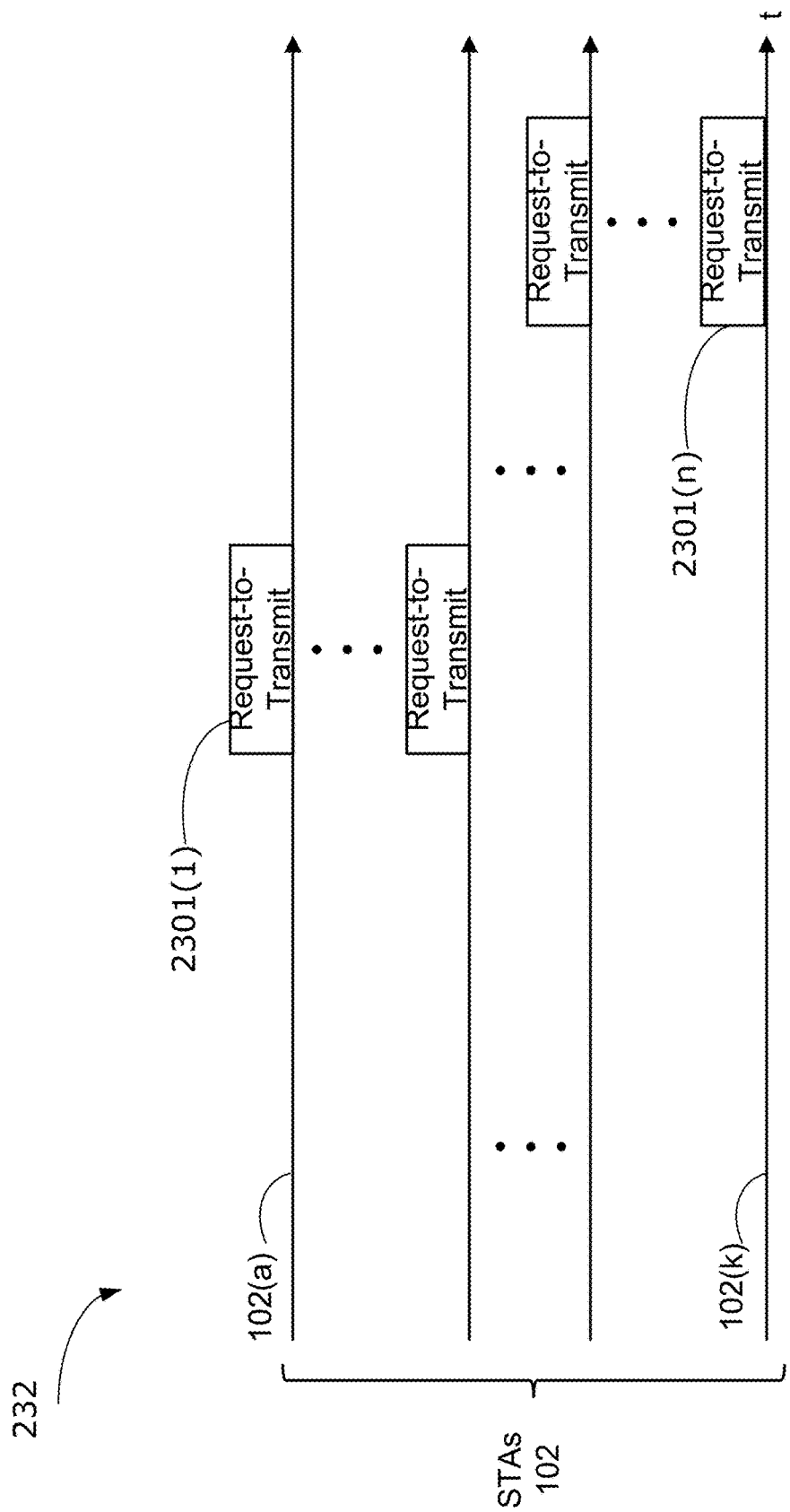

With respect to determining network status information for an UL transmission, FIG. 2F illustrates an example method 230 how each STA 102 reports their status information to the AP 101. FIG. 2G shows each request-to-transmit (RTT) frame is transmitted from each associated STA 102 to implement steps of the example method 230.

At step 231, each associated STA 102 determines its status information, including power status information and the CSI. In this example, each associated STA 102 within the BSS communicates its status information to the AP 101 without prompting from the AP 101. Each STA 102 may estimate the CSI in their respective UL channels.

At step 232, each STA 102 reports their determined status information to the AP 101. In some examples, the determined status information may be reported by transmitting respective RTT frames 2301(1) to 2301(n) (generically referred to as request-to-transmit frame 2301) as shown in FIG. 2G. Each transmitted RTT frame from a STA 102 includes the most recent status information of the STA 102. In some examples, each selected STA 102 can determine and transmit its respective power status information, size of payload data of the STA 102, and transmission priority. Therefore, the status information in the RTT frame that is reported by the STA 102 to the AP 101 can include the power status information, the size of payload data, and the transmission priority.

In this example of UL transmission, each STA 102 associated with the AP 101 reports their respective status information, including power status information, to the AP 101 within the BSS, which enables the AP 101 to have a recent, and continually updated, overall view of each STA's status information. The AP 101 can then determine the most appropriate respective resource allocation information to be used by each of the STAs.

For the DL direction, each STA 102 transmits its status information to the AP 101. For example, the method 220 uses respective frames (which can be different frames for each STA 102), as shown in FIG. 2E, for each selected STA 102 to report their status information in response to inquiry from the AP 101. Therefore, in some examples, the steps 221 to 223 as shown in FIG. 2D may be implemented before the AP 101 performs step 211 (FIG. 2B).

For the UL direction, the method 230 uses respective RTT frames (which can be different frames for each STA 102) as shown in FIG. 2G, which illustrates how each associated STA 102 initiatively reports their status information respectively in UL direction. The steps 231 to 232 as shown in FIG. 2E may be implemented before the AP 101 performs step 211 (FIG. 2B).

At step 214 in FIG. 2B, now that the AP 101 has determined respective resource allocation information for each STA 102 (all associated STAs or the selected STAs), the AP 101 can transmit a control frame to inform each STA 102 of their respective resource allocation information. The resource allocation information within the control frame for UL or DL transmission is now described in greater detail with reference to FIG. 2H and FIG. 2I.

Figure 2H:
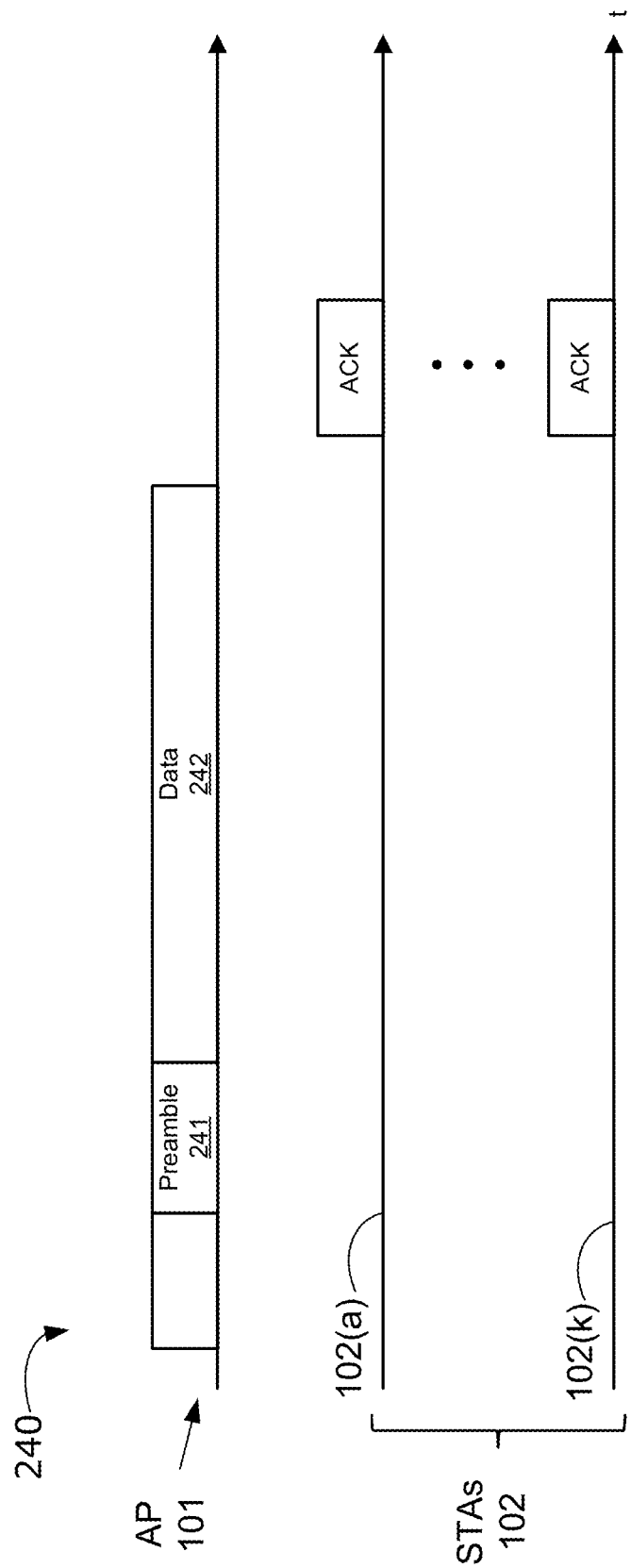
FIG. 2H illustrates an example frame of a control frame, for downlink transmission, to transmit resource allocation information from the AP to the STAs.

FIG. 2H shows a DL MU frame 240 that is the control frame which is used to transmit respective resource allocation information to the selected STAs 102 in the DL direction. The DL MU frame 240 includes a preamble field 241 and a data field 242. The preamble field 241 is used to indicate at least the respective resource allocation information for each of the selected STAs 102. Additional control information is contained in the preamble field 241. In some examples, the preamble field 241 includes one or more reserved subfields that include an identification of each spreading sequence that the AP 101 is using to spread the payload data for each selected STA 102, and a number of sub-carriers that the AP 101 is using to spread the payload data for each selected STA 102. In some examples, the one or more reserved subfields can be a common subfield indicating that the AP 101 has used the same spreading sequence and the same number of sub-carriers for the DL MU frame 240 that was transmitted to all of the selected STAs 102. In other examples, the one or more reserved subfields are different for each STA 102, and can be within a user specific subfield that is specific to each STA 102. The length of the spreading sequence to be used is equal to the number of sub-carriers that the AP 101 uses to spread each data symbol. The data field 242 includes respective payload data that was spread by the AP 101 over the plurality of sub-carriers, for transmitting to the STAs 102. Payload data to a respective selected STA 102 is spread by the AP 101 over the plurality of sub-carriers by using the respective identified spreading sequence. In example embodiments, the data field 242 of the DL MU frame 240 is generated by the AP 101 by spreading individual data symbols of the payload data into a plurality of spread data symbols, and modulating each spread data symbol with a different sub-carrier. The DL MU frame 240 is transmitted to each of the selected STAs 102. Each of the selected STAs 102 can de-spread the received data symbols based on its corresponding resource allocation information.

In some examples, the AP 101 may be configured to reduce its own transmitting peak power in a flexible manner by variably spreading its payload data in the DL MU frame 240 in proportion to the power status of the AP 101. This can be performed, for example, when the AP 101 is using a backup battery 550 (FIG. 5), such as in the case of a power outage.

Figure 2I:
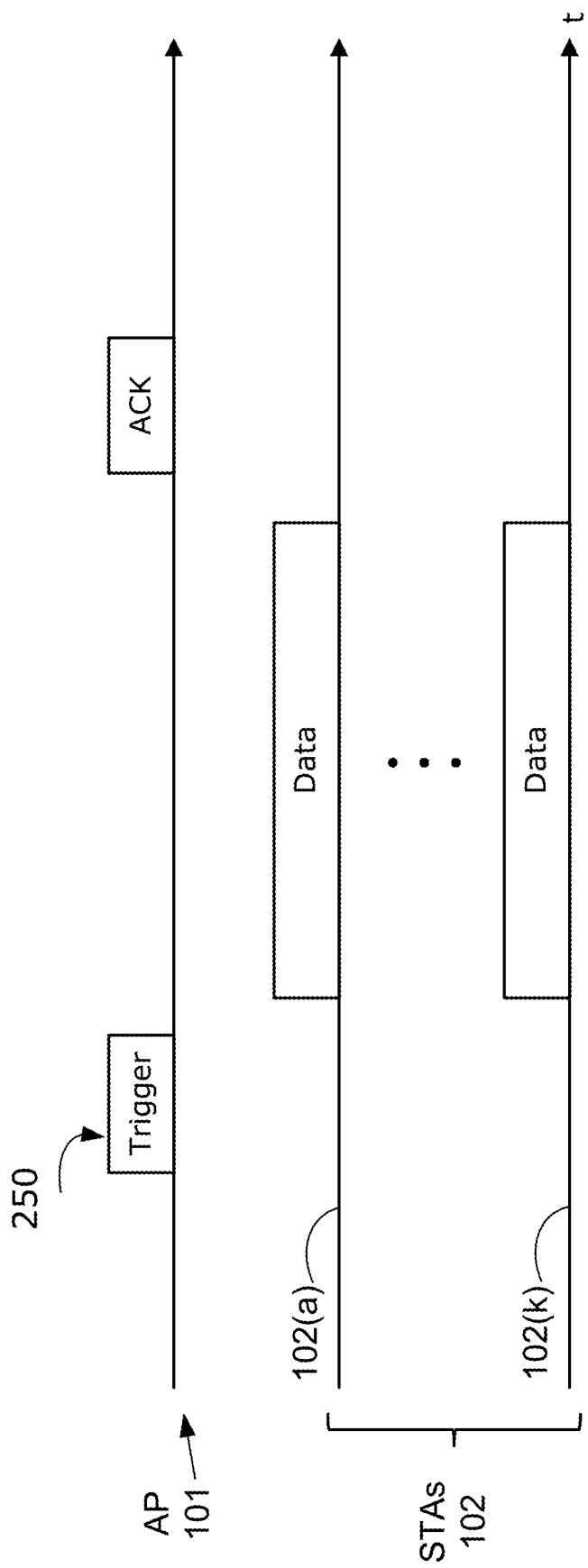
FIG. 2I illustrates another example frame of a control frame, for uplink transmission, to transmit resource allocation information from the AP to the STAs.

FIG. 2I shows an example of a control frame that is used to transmit the determined resource allocation information to each associated STA 102 in the UL direction. In this example, the control frame is a trigger frame 250. In order to transmit resource allocation information of each associated STA 102 in respective UL transmissions, a broadcast signal may be transmitted that has one single trigger frame 250. The trigger frame 250 can have one or more reserved subfields that indicate the respective number of sub-carriers which is to be used by each STA 102 to spread their respective payload data, and the identification of the spreading sequence to use. In some examples, the one or more reserved subfields of the trigger frame 250 can be a common subfield in which the same spreading sequence and number of sub-carriers is signaled to all STAs 102. In other examples, the one or more reserved subfields of the trigger frame 250 is particular (and different) for each STA 102.

Each associated STA 102 transmits a UL transmission (e.g. a UL MU PPDU frame) to the AP 101 in accordance with the respective resource allocation information that was received through the trigger frame 250. In an example, the respective resource allocation for different associated STAs 102 is included within one single trigger frame 250 that is broadcast to all STAs 102. The trigger frame 250 includes the respective resource allocation information of each associated STA. In other examples, the resource allocation information for different STAs is included within different trigger frames 250. The trigger frame 250 is transmitted to each of the associated STAs 102 to inform each associated STA 102 of that STA's corresponding resource allocation information, which will be utilized in that STA's UL transmission. After each STA 102 receives the trigger frame 250, the STA 102 will perform spectrum spreading to spread the payload data of that STA 102 over the plurality of sub-carriers for the UL transmission, in accordance with the resource allocation information that was included within the trigger frame 250. In an example embodiment, as described in greater detail herein, the UL transmission is generated by the STA 102 by spreading individual data symbols of the payload data into a plurality of spread data symbols, and modulating each spread data symbol with a different sub-carrier of the respective plurality of sub-carriers.

By collecting each STA's status information, including power status information, the AP 101 can determine the respective resource allocation information to the selected STAs 102 in order to reduce peak power consumption and to achieve the required data rate, and then transmit the respective resource allocation information using a control frame. Moreover, resource allocation information of each associated STA 102 can include flexible parameters including the identification of which spreading sequence to use, and the number of sub-carriers to spread the payload data (which is also the length of the spreading sequence to use). The resource allocation information is transmitted to the associated STA 102, and is used to spread payload data of the associated STA 102 over the plurality of sub-carriers, leading to reduced peak power consumption.

With respect to DL transmissions, the AP 101 determines respective resource allocation information for each selected or associated STA 102 based on the network status information, and the AP 101 spreads respective payload data of each associated STA 102 using a respective spreading sequence. The respective resource allocation information is used to spread the respective payload data transmitted to each associated STA 102. The DL transmission can be a DL MU PPDU frame that includes both the resource allocation information and the spread payload data. Based on the network status information, the AP 101 selects a length of the spreading sequence to spread the respective payload data, which is used to vary the data rate of the transmission. Moreover, the AP 101 may adjust the data rate of transmission to satisfy specific demand of each selected or associated STA 102. The AP 101 also selects which spreading sequence(s) are used to spread the payload data for transmitting to each STA 102. In UL transmission, the AP 101 transmits a trigger frame 250 to the STA 102 which includes the identification of the spreading sequence and the respective number of sub-channels to spread payload data. For the UL transmission, the STA 102 spreads respective payload data over the plurality of sub-carriers in accordance with that STA's resource allocation information. The spread payload data is transmitted from each STA 102 to the AP 101 in the UL direction. By transmitting spread payload data in UL or DL transmissions to occupy a number of sub-carriers, this provides flexibility of the AP 101 controlling the data rate and the peak transmission power of the UL or DL transmissions.

Figure 3A:
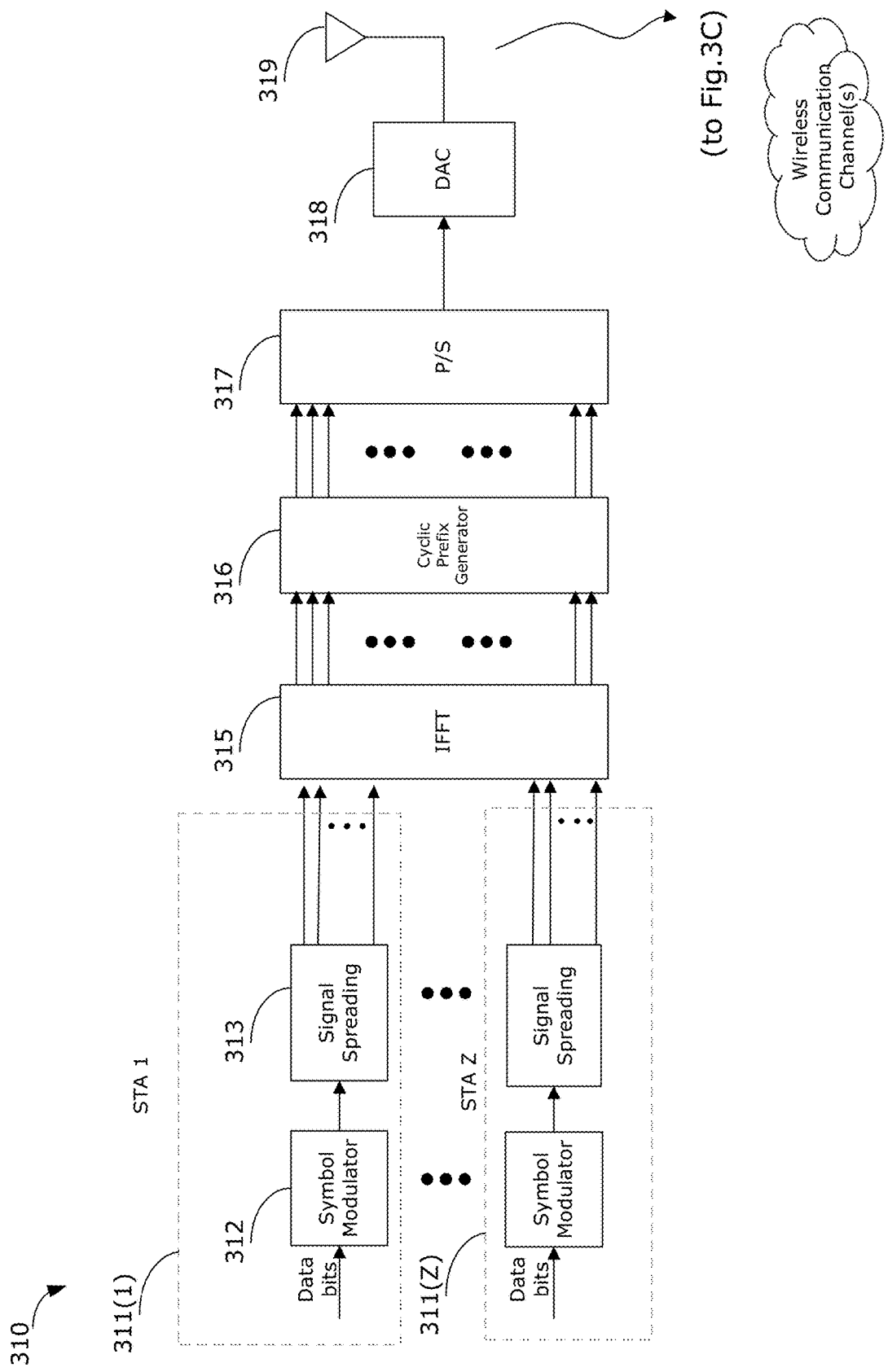
FIG. 3A is a schematic diagram of a transmitter according to example embodiments.

Reference is now made to FIG. 3A, which illustrates a transmitter 310 for signal spreading, in accordance with an example embodiment. The transmitter 310 is configured to spread payload data and modulate the spread payload data over a number of sub-carriers. In some examples, the transmitter 310 may be included within the AP 101 or the STA 102 to implement the DL or UL transmission, respectively. For example, in DL direction, the transmitter 310 may be included within the AP 101 to spread respective payload data to STAs 102 on their respective sub-carriers in one or more RUs. In UL direction, the transmitter 310 may be included within an associated STA 102 to spread payload data of the STA 102 on its respective sub-carriers in one or more RUs.

As shown in FIG. 3A, the transmitter 310 includes a plurality of transmitting (Tx) paths 311(1) to 311(Z) (generically referred to as Tx path 311) for a plurality of data bits of the payload data. When the transmitter 310 is in the AP 101, for DL transmission, the AP 101 can generate Tx paths 311 for different respective STAs (e.g., STA 1 to STA Z).

One Tx path 311 for the STA 102 will now be described in detail. A series of bits are received by the symbol modulator 312 in the Tx path 311. The symbol modulator 312 performs symbol modulation on the bits of the payload data to data symbols (also known as a constellation symbols). The data symbols can be represented as amplitude and phase, or cosine and sine coefficients, or other nomenclatures, as is understood in the art. The symbol modulation can be based on symbol modulation schemes such as amplitude-shift keying (ASK), phase-shift keying (PSK), quadrature amplitude modulation (QAM), or any other appropriate method of mapping series of data bits to a modulated symbol. The QAM constellations can be specified by cosine and sine coefficients in quadrature.

Taking a digital 16-QAM scheme for example, 4 defined bits of payload data can be symbol modulated to one of 16 possible data symbols. Therefore, 256 bits of payload data of the STA can be modulated to 64 data symbols, for example. In the digital 16-QAM scheme, a series of bits can be split into series of 4 bits that are each input to the symbol modulator 312. The data symbols are output from the symbol modulator 312. Each data symbol is fed to a signal spreading block 313. The output from the signal spreading block 313 is a plurality of spread data symbols for each data symbol.

Given a RU having $P_u$ sub-carriers, the number (denoted by $\Theta_u$) of the data symbols that can be transmitted each time for the STA is defined by the following equation (1):

$$\Theta_u = P_u/L; \qquad \text{Equation (1)}$$

In equation (1), L represents a spectrum expanding factor, which is the length of the spreading sequence.

Each data symbol is spread by the signal spreading block 313 to output a plurality of spread data symbols for that data symbol. In some examples, each STA is assigned sub-carriers of one RU. More than one RU can be assigned to each STA in other examples. Each spread data symbol may be referred to as a chip. With respect to each data symbol, that data symbol's spread data symbols are each assigned a different sub-carrier. The spread data symbols of each data symbol are provided to an Inverse Fast Fourier Transform (IFFT) block 315 to transform the spread data symbols to the assigned sub-carriers in time domain. Other types of inverse Fourier transforms can be performed in other examples. The output from the IFFT block 315 are OFDMA waveforms in time domain, one for each STA and in parallel. The cyclic prefix generator 316 adds a cyclic prefix to the OFDMA waveforms. The parallel to serial converter (P/S) 317 converts the parallel OFDMA waveforms of multiple STAs into a serial digital signal. The serial digital signal is converted by a digital-to-analog converter 318 to an analog signal, which is transmitted via an antenna 319.

FIG. 3B shows how a modulated data symbol is spread by the signal spreading block 313 using a spreading sequence. An ith data symbol (denoted as $d_{i,u}$) is provided to the signal spreading block 313 for spectrum spreading. The spreading sequence $C_u(n)=[c_{0,u}, c_{1,u}, \ldots, c_{L-1,u}]$ (labelled by a dashed box 3131) has a spectrum expanding factor L. The spectrum expanding factor L indicates that the length of the spreading sequence $C_u(n)$ is L, which means that the spreading sequence $C_u(n)$ has L chips. The chips of the spreading sequence can be complex vectors or real numbers, with coefficients that equal −1 or +1. The data symbol $d_{j,u}$ is multiplied by each chip of the spreading sequence $C_u(n)$ to output a corresponding spread data symbol $S_u(n)$, which is defined by the following equation (2):

$$S_u(n) = d_{i,u} \times C_u(n) \qquad \text{Equation (2)}$$

In equation (2), n can have any of the values: 0, 1, ..., L−1; and $d_{i,u}$ represents the ith data symbol outputted from the symbol modulator 312 for STA "u". As described above, the ith data symbol $d_{i,u}$ outputted by the QAM modulation is a complex vector in which j is the square root of −1, and which may be defined by equation (3):

$$d_{i,u} = I + jQ \qquad \text{Equation (3)}$$

In equation (3), −1≤I≤1 and −1≤Q≤1.

By way of one example only, a numerical example of the spreading sequence has a length L, and in which j is the square root of −1, is presented by equation (4):

$$C_u(n) = [1+j, -1-j, -1-j, -1-j, \ldots, 1+j, \ldots, -1-j] \qquad \text{Equation (4)}$$

In equation (4), each chip is a complex vector that has coefficients equal to −1 or +1. Thus, by spreading the data symbol $d_{i,u}$ using the spreading sequence such as in equation (4), L chips of spread data symbols for that data symbol $d_{i,u}$ are output from the signal spreading block 313.

In accordance with equations (2), (3), and (4), a spread data sequence Six is arrived at by multiplying Equation (3) with Equation (4), to arrive at a plurality of spread data symbols $S_u(n)$. The spread data sequence Six is represented by equation (5):

$$S_{i,L} = [x_1+jy_1, x_2+jy_2, \ldots x_L+jy_L] \qquad \text{Equation (5)}$$

In equation (5), −1≤$x_i$≤1 and −1≤$y_i$≤1. In equation (5), the number of spread data symbols corresponds to the length of the spreading sequence. The number of spread data symbols for each data symbol is L. The spread data sequence $S_{i,L}$ has L chips. Each chip is a complex vector. The length of the spreading sequence, as described above, is dependent on the required data rate of the transmission and the power status information (e.g. remaining battery capacity) of each STA 102.

The IFFT block 315 converts the L chips of the spread data symbols $S_u(n)$ to time domain. Thus, each data symbol outputted from the symbol modulator 312 is spread over L different sub-carriers within a RU, which enables payload data to be spread over less than the entire RU bandwidth, if desired.

For a given data symbol, each of that data symbol's spread data symbols are assigned a different sub-carrier. For that data symbol, the output of the IFFT block 315 may be L signals, each over a respective sub-carrier for each of that data symbol's spread data symbols. Accordingly, payload data of each STA is spread over a plurality of sub-carriers using the transmitter 310.

In some examples, the spreading sequence $C_u(n)$ can selected from a set of Walsh-Hadamard sequences (which are orthogonal spreading sequences). In some other examples, the spreading sequence $C_u(n)$ may be selected from a set of Zadoff-Chu sequences (which are orthogonal spreading sequences). In some examples, the spreading sequence $C_u(n)$ may be selected from other sets of orthogonal spreading sequences, which have cross-correlation equal or close to zero. In some other examples, the spreading sequence $C_u(n)$ may be a Pseudo-random Noise (PN) spreading sequence or selected from non-orthogonal spreading sequences, depending on the particular application. This is only illustrative and is not intended to be limiting. In other examples, the spreading sequence $C_u(n)$ may be any suitable spreading sequence.

Each spread data symbol $S_u(n)$ is modulated and mapped into a respective sub-carrier within a RU. The mapping relationship is defined by the following equation (6):

$$R_u[i(L-1)+n]=S_u(n)=d_{i,u} \times C_u(n) \qquad \text{Equation (6)}$$

In Equation (6), i is the ith data symbol of STA "u"; L is the spectrum spreading factor which represents the length of the spreading sequence; n is 0, 1, . . . , L−1; i is 0, 1, . . . , $\Theta_u$−1, where $\Theta_u$ is defined by equation (1) above. In equation (6), the number of sub-carriers corresponds to the number of spread data symbols. The number of sub-carriers can be referred to as N. The number of sub-carriers N is therefore equal to L. Modulation and mapping the spread data symbol $S_u(n)$ into a plurality of sub-carriers within a RU is implemented by the IFFT 315 as shown in FIG. 3A.

In equation (6), the plurality of spread data symbols are mapped into a plurality of sub-carriers within a RU. The number of sub-carriers can be flexible, depending on the power status information of the STA, and can be less than a maximum number of available sub-carriers in the RU.

Compared to conventional methods, spreading data symbols using variable length of spreading sequence may enable the number of sub-carriers carrying payload data of a particular STA to be varied dynamically within a RU. Peak transmission power is dynamically reduced by spreading the payload data over a number of the sub-carriers.

For a DL transmission by the AP 101 to the particular STA, given there are N sub-carriers for each OFDMA signal, the OFDMA signal can be generated by implementing an M-point inverse Fast Fourier transform (IFFT). The IFFT is performed by the IFFT block 315 using the following equation (7) to convert the spread data symbol $S_u(n)$ in frequency domain into time domain to implement the DL transmission.

$$x(n)=\Sigma_{u=1}^{Z}\Sigma_{k=0}^{N-1}R_u(k)e^{j2\pi[P_u(u-1)+k]n/N} \qquad \text{Equation (7)}$$

In equation (7), each OFDMA signal includes spread payload data of different STAs from 1 to Z. Payload data of STAs 1 to Z is spread over different numbers of sub-carriers of the N sub-carriers. Therefore, in addition to reducing transmission power, different STAs can also share sub-carriers within each OFDMA signal to improve transmission efficiency.

The data rate of transmitting payload data may be dynamically varied in accordance with the dynamic length of the spreading sequence. The number of sub-carriers to be used does not necessarily need to be all of the sub-carriers in the RU, thereby allowing the adjustment of data rate and peak power consumption of the transmission as desired.

In equations (2) and (3), each data symbol is represented by a complex vector that is spread by a spreading sequence. This is only illustrative and is not intended to be limiting. In other examples, other formats of each data symbol and the spreading sequence may have any other suitable form or nomenclatures and may have different configurations.

In the transmitter 310, payload data for each STA is modulated to data symbols, and the data symbols are spread into spread data symbols by using a corresponding spreading sequence, and the spread data symbols for a given data symbol are modulated over different sub-carriers, which are outputted as OFDM signals in time domain. The OFDM signals in time domain are transmitted from the transmitter 310 via the antenna 319. In the DL direction, the OFDMA signals are included in a control frame transmitted by the transmitter 310 of the AP 101, in a DL MU frame 240 (FIG. 2H), to each selected or associated STA. When each selected STA 102 receives the DL MU frame 240, the selected STA 102 can demodulate the DL MU frame 240, and obtain the resource allocation information associated with that STA 102. The resource allocation information may include an identification of the spreading sequence and the number of sub-channels that was used to spread the payload data (corresponds to the length of the spreading sequence). The identification of the spreading sequence specifies the spreading sequence that was used. For example, the identification of the spreading sequence may indicate that the spreading sequence is a particular Walsh-Hadamard sequence. The length of spreading sequence may indicate that the Walsh-Hadamard sequence's length is L, for example. The resource allocation information is used to generate and transmit the OFDMA signal from the AP 101. Each selected STA 102 de-spreads and processes the received OFDMA signal using the resource allocation information for that STA 102.

The transmitter 310 therefore modulates series of bits of payload data to data symbols and spreads each data symbol over a plurality of sub-carriers within one or more RUs, in accordance with the resource allocation information, which provides flexibility of peak power consumption and data rate. In some examples, the transmitter 310 can support different kinds of coding and spreading functions for various scenarios.

Figure 3C:
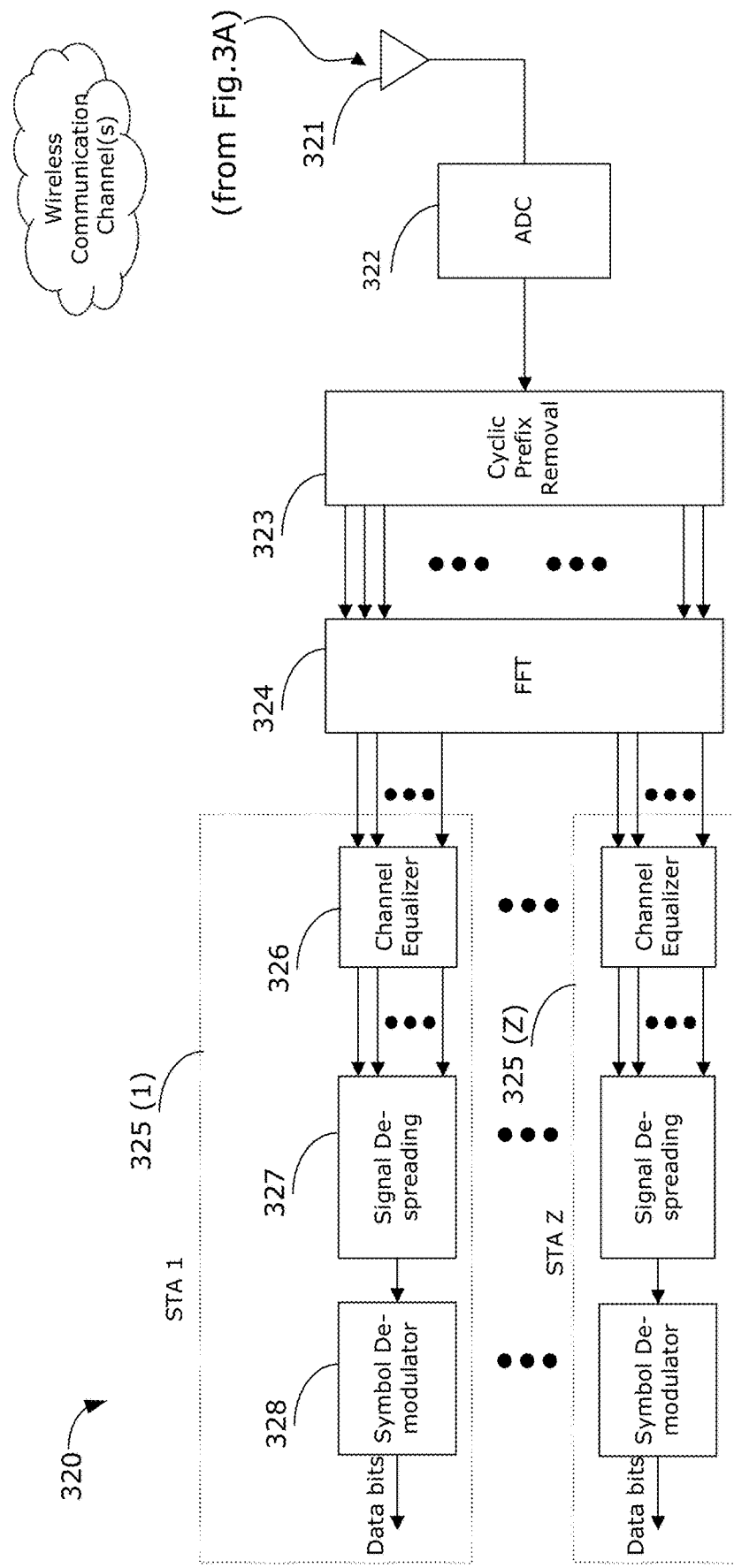
FIG. 3C is a schematic diagram of a receiver according to example embodiments.

Reference is now made to FIG. 3C, which illustrates a receiver 320 for demodulating and de-spreading each received OFDMA signal in accordance with an example embodiment. In some examples, the receiver 320 may be included within each STA 102 to de-spread the received OFDMA signal from the DL transmission of the AP 101. In some examples, the receiver 320 may be included within the AP 101 to de-spread received OFDMA signals from the UL transmission of the STAs 102. As presented in FIG. 3C, the receiver 320 includes an antenna 321, an analog-to digital converter (ADC) 322, a cyclic prefix removal block 323, a fast fourier transform (FFT) block 324, and a plurality of receiving (Rx) paths 325(1) to 325(Z) (generically referred to as Rx path 325) on which spread payload data is received and the desired payload data is recovered. For DL transmission, only one receiving path corresponding to one STA 102 needs to be processed by the receiver 320 of the corresponding STA 102. For UL transmission, all of the receiving paths, corresponding to all STAs 102, can be processed by the receiver 320 of the AP 101.

The antenna 321 receives analog signals from wireless communication channels, such as from the transmitter 310 as shown in FIG. 3A. The ADC 322 converts each received analog signal into a digital signal. The cyclic prefix removal block 323 removes a cyclic prefix from the digital signal. The FFT block 324 then transforms the cyclic prefix removed digital signal in time domain into data symbols. The data symbols for each STA 102 from the FFT block 324 are processed on a respective one of the plurality of Rx paths. For clarity, one Rx path 325(1) is indicated by a dashed box. One Rx path 325 will now be described with in detail. Data symbols are provided to a channel equalizer 326 for equalization, which may help to reduce inter-symbol interference (ISI) and noise effects for better demodulation. The equalized data symbols from the channel equalizer 326 are de-spread by the signal de-spreading block 327. The symbol demodulator 328 uses symbol demodulation to demodulate the de-spread data symbols into series of bits for the STA 102 to recover the payload data. The signal de-spreading block 327 de-spreads the plurality of spread data symbols from each data symbol to the original data symbol, using the spreading sequence, and the symbol de-modulator 328 demodulates each data symbol into a series of bits of payload data.

FIG. 3D shows how a plurality of equalized data symbols are de-spread by the signal de-spreading block 327 using the same spreading sequence 3131 that was used in the signal spreading block 313 of FIG. 3B. To recover the payload data from the signal received from the transmitter 310 in the receiver 320, the identification of a spreading sequence and the length of the spreading sequence for the transmitting STA are used. The identification and the length of the spreading sequence 3131 are identical to those that were used in the transmitter 310 (FIG. 3A). As shown in FIG. 3D, L bits spectrum spreading sequences $c_{0,u}, c_{1,u}, \ldots, c_{L-1,u}$ are used to be multiplied with respective equalized data symbols $S_u(0), S_u(1), \ldots, S_u(L-1)$ to output one de-spread data symbol $d_{i,u}$ (note the de-spread data symbol $d_{i,u}$ has L chips). The de-spread data symbols $d_{i,u}$ are then demodulated to output a series of bits of payload data. The series of bits may then be supplied to other components of the receiver 320, such as a digital signal processor (DSP). The resource allocation information which is used to de-spread the payload data may be obtained from the DL MU frame. For example, in DL transmissions, the receiver 320 within each STA 102 may receive a DL MU frame that includes the spread payload data and the resource allocation information. The receiver 320 may de-spread the received spread payload data by using the received resource allocation information corresponding to the associated STA 102. With respect to UL transmission, the receiver 320 within the AP 101 may receive spread payload data from each associated STA 102. The receiver 320 within the AP 101 may de-spread the received spread payload data by using the resource allocation information, corresponding to the respective associated STA 102, that was stored within the AP 101.

In UL direction, spread payload data is transmitted from each associated STA 102 to the AP 101 in response to the STA 102 receiving a control frame, such as a trigger fame 250 as shown in FIG. 2I. The trigger frame 250 includes resource allocation information having a number of sub-carriers of one or more RUs for spreading of payload data of each associated STA. In this example, the trigger frame 250 may also include an identification of the spreading sequence and a number of sub-carriers to spread payload data (corresponding to a length of the spreading sequence). After each STA 102 receives the trigger frame 250, the STA 102 (having the transmitter 310) can spread payload data of the STA 102 over a plurality of sub-carriers using the received resource allocation information, and modulate the spread data symbols over the sub-carriers of the one or more RUs. The AP 101 (having the receiver 320) can de-spread the received OFDMA signal using a spreading sequence of the STA 102, which was stored within the AP 101. The signal de-spreading block 327 of the AP 101 is used to de-spread each received OFDMA signal based on the resource allocation information.

Figure 4A:
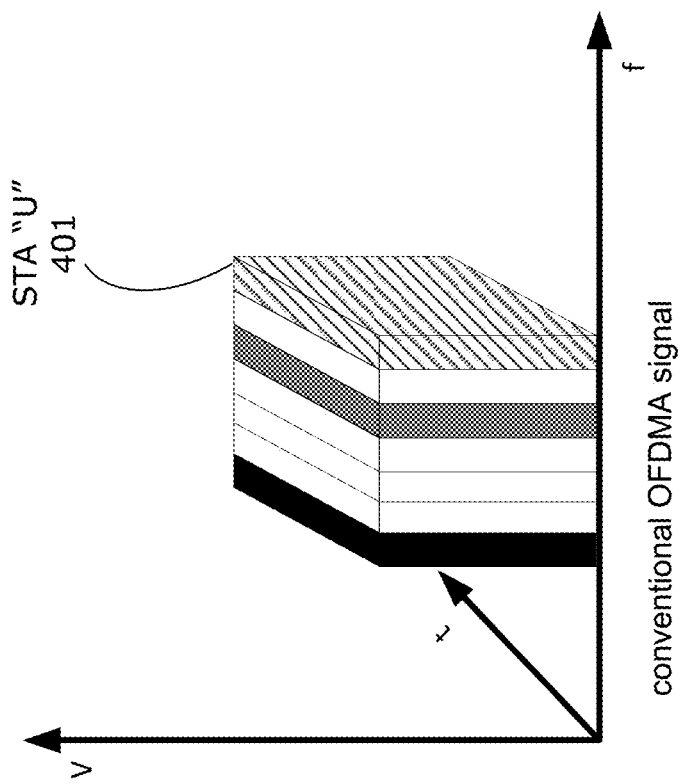
FIG. 4A illustrates a graph of conventional Orthogonal Frequency Division Multiple (OFDMA) non-spreading of payload data for each STA.
Figure 4B:
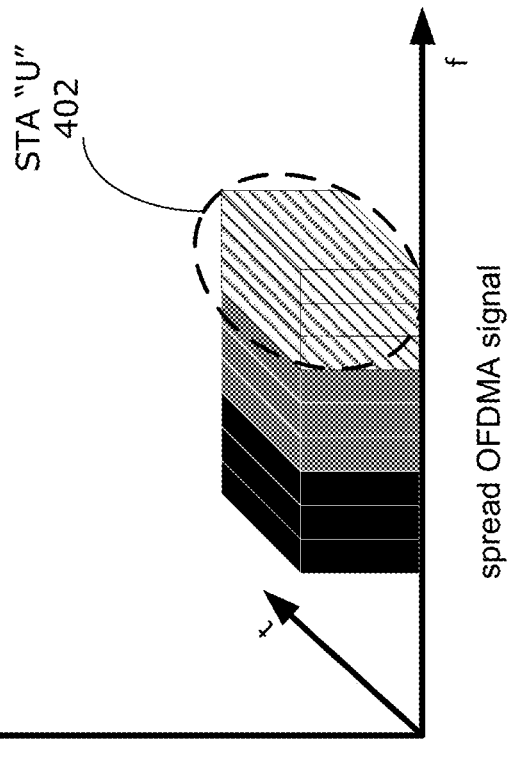
FIG. 4B illustrates a graph of spreading payload data over a plurality of sub-carriers for each STA, in accordance with example embodiments.

Reference is now made to FIGS. 4A and 4B, which illustrate a comparison of sub-carrier use between a conventional OFDMA signal without spreading (FIG. 4A) and an OFDMA signal with spreading (FIG. 4B). FIGS. 4A and 4B illustrate graphs of voltage output (v), time (t) and frequency (f) for their respective OFDMA signals. Each type of shaded block represents a STA. FIG. 4A illustrates sub-carrier use for a STA (e.g., STA "U") to perform conventional OFDMA transmission without spreading. For example, an OFDMA transmission for the STA (e.g., STA "U") is on sub-carrier 401. In contrast, FIG. 4B shows a plurality of sub-carriers, labelled by dashed circle 402, which are used for the STA. FIG. 4B illustrates that the OFDMA signal for the STA is spread over a plurality of different sub-carriers, in accordance with the spreading performed by the transmitter 310 in accordance with example embodiments. The OFDMA signal for the STA in FIG. 4B is spread over three sub-carriers. The number of sub-carriers is the same as the length of the utilized spreading sequence that was used to spread the data symbol. As well, the voltage output (which corresponds to the output power consumption) for the STA "U" in FIG. 4B is lower per sub-carrier than the voltage output for the single sub-carrier of the STA in FIG. 4A. Because output power is proportional to the voltage output, power consumed in transmitting the OFDMA signal with spreading is lower than power consumed in the conventional OFDMA transmission without spreading. Therefore, peak power consumption is reduced when transmitting an OFDMA signal with spreading.

Note that the number of sub-carriers to spread the OFDMA signal is another flexible variable that is used in example embodiments, as compared to some conventional OFDMA systems that have no spreading or spreading to only the maximum number of sub-carriers in a RU. As well, a STA 102 can be assigned sub-carriers of more than one RU in some examples.

In at least some examples, for example when a higher data rate for a STA 102 is desired, orthogonal spreading sequences can also be used so that sub-carriers in a RU can carry more payload data. For example, for spreading of the payload data of the STA 102, a plurality of spreading sequences ("K" spreading sequences) that are orthogonal can be used. In some examples, the spreading sequences have cross-correlation equal or close to zero with the other spreading sequences. For any one STA, a first spreading sequence is used for a first set of data symbols (e.g., one QAM constellation), to result in first spread data symbols that are modulated over the sub-carriers of the RU. A second spreading sequence is used for a second set of data symbols of the STA (e.g. a second QAM constellation for a next series of bits of the STA), to result in second spread data symbols that are modulated over the same sub-carriers of the RU as the first spread data symbols. This spreading of payload data over the same sub-carriers can continue for spreading sequences up to K spreading sequences. For each data symbol, that data symbol's spread data symbols are modulated over a different sub-carrier. In some examples, all of the K spreading sequences have a same length. Accordingly, K times the payload data can be transmitted simultaneously over the RU by using the orthogonal spreading sequences. Thus, for the STA 102 (e.g., STA"U"), code-division multiplexing within one RU may be used to provide further data rate capacity by using the orthogonal spreading sequences.

With respect to multi-user scenarios, all of the STAs may use the same or partially overlapping sub-carriers for transmission. For example, each STA uses a spreading sequence for spreading of data symbols which has good auto-correlation and is orthogonal with respect to one or more other spreading sequences utilized by other STAs. A plurality of STAs can use the same sub-carriers with respect to each other because the spread data symbols for respective STAs are orthogonal. In some examples, the spreading sequences have cross-correlation equal or close to zero. Multiple STAs, or all of the STAs, can therefore share at least some of the same sub-carriers within a RU. In some examples, the length of the spreading sequence for one STA is the same as another STA. In other examples, the length of the spreading sequence for one STA can be different than the length of the spreading sequence for another STA.

In other examples, different STAs may utilize different sub-carriers for spreading of the payload transmission, as in FIG. 4B. For example, each STA is assigned its own RU, and therefore has its own assigned sub-carriers. For any one STA, the same spreading sequence could be used to spread each of the data symbols over a number of the sub-carriers, in one example. In such an example, the spreading sequence can be a Pseudo-random Noise (PN) sequence, and does not necessarily require particular auto-correlation or cross-correlation properties of the spreading sequences for different STAs. For example, a first STA can be assigned its own RU, and therefore has its own assigned sub-carriers. A second STA can be assigned its own RU different from the RU of the first STA, and therefore has its own assigned sub-carriers. The data payload for the second STA can be spread using the same or different spreading sequence that is used for the first STA, without overlap in sub-carriers.

When the sub-carriers of the different STAs are all different sub-carriers, any spreading sequences can be used. For example, the spreading sequences for each STA can be the same or can be different. The spreading sequences can be a Pseudo-random Noise (PN) sequence, and do not necessarily require cross-correlation close to zero. In some examples, the length of the spreading sequence for one STA is the same as another STA. In other examples, the length of the spreading sequence for one STA can be different than the length of the spreading sequence for another STA.

Accordingly, in high-density scenarios, the resource allocation can allow multiple STAs to share one single RU by spreading each data symbol of payload data using corresponding orthogonal spreading sequences which may increase the average throughput per STA by multiple times and boost system performance in a wireless communication network.

It will be appreciated that the example methods to enable payload data to be spread over a variable number of sub-carriers within one or more RUs may be implemented within 802.11ax standards, including high efficiency wireless (HEW). Example methods may also be implemented within the IEEE 802.15 group of standards, Zigbee™, or other IoT, Machine-To-Machine or wireless personal area network (WPAN) standards. Example methods and systems may be implemented in other suitable wireless communication standards, as applicable.

FIG. 5 is a schematic diagram of an example wireless communication device 500, in accordance with example embodiments. For example, the wireless communication device 500 may be the AP 101 or the STA 102, and may include the transmitter 310 (FIG. 3A) or the receiver 320 (FIG. 3C). The wireless communication device 500 may be used for multiple access communications within the wireless communication network 100. Although FIG. 5 shows a single instance of each component, there may be multiple instances of each component in the wireless communication device 500 and the wireless communication device 500 could be implemented using parallel and distributed architecture.

The wireless communication device 500 may include one or more processing devices 505, such as a processor, a microprocessor, an application-specific integrated circuit (ASIC), a field-programmable gate array (FPGA), a dedicated logic circuitry, or combinations thereof. The wireless communication device 500 may also include one or more optional input/output (I/O) interfaces 510, which may enable interfacing with one or more optional input devices 535 and output devices 570. The wireless communication device 500 may include one or more network interfaces 515 for wired or wireless communication with a network (e.g., an intranet, the Internet, a P2P network, a WAN, a LAN, or a Radio Access Network (RAN)) or other node. Wireless networks may make use of wireless connections transmitted over an antenna 575. The network interface(s) 515 may provide multiple access wireless communication via one or more transmitters or transmit antennas and one or more receivers or receive antennas, for example. In this example, one antenna 575 is shown, which may serve for multiple access transmission. However, in other examples there may be multiple antennas for transmitting and receiving. In some examples, an antenna array may be used. The wireless communication device 500 may also include one or more storage units 520, which may include a mass storage unit such as a solid state drive, a hard disk drive, a magnetic disk drive or an optical disk drive.

The wireless communication device 500 may include one or more non-transitory memories 525 that can include physical memory 540, which may include a volatile or non-volatile memory (e.g., a flash memory, a random access memory (RAM), or a read-only memory (ROM)). The memory 525 (as well as storage unit(s) 520) may store instructions for execution by the processing device(s) 505, such as to carry out processing such as those described in the present disclosure. The memory 525 may include other software instructions, such as for implementing an operating system (OS), and other applications/functions. In some examples, one or more data sets or modules may be provided by an external memory (e.g., an external drive in wired or wireless communication with the wireless communication device 500) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 530 providing communication among components of the wireless communication device 500. The bus 530 may be any suitable bus architecture including, for example, a memory bus, a peripheral bus or a video bus. Optional input device(s) 535 (e.g., a keyboard, a mouse, a microphone, a touchscreen, or a keypad) and optional output device(s) 570 (e.g., a display, a speaker or a printer) are shown as external to the wireless communication device 500, and connected to optional I/O interface 510. In other examples, one or more of the input device(s) 535 or the output device(s) 570 may be included as a component of the wireless communication device 500.

The transmitter 310 and the receiver 320 may be included as one or more components of the wireless communication device 500. For example, the transmitter 310 and the receiver 320 may be included as a single component for transmitting and receiving radio frequency (RF) analog signals, and provide spreading and de-spreading using a spreading sequence having corresponding resource allocation information. In other examples, the transmitter 310 and the receiver 320 may be included as two separate components for transmitting and receiving radio frequency (RF) analog signals respectively. The transmitter 310 may provide spreading using a respective spreading sequence and the receiver 320 may provide de-spreading using the respective spreading sequence.

When the wireless communication device 500 is the AP 101, communication with selected or associated STAs 102 can be performed using the antenna 575. The processing device 505 may carry out the steps or steps such as including determining different respective resource allocation information, as described above in accordance with each received STAs' status information. The resource allocation information, such as identifications and lengths of respective spreading sequences, may be stored in the storage unit(s) 520 or memory 525.

When the wireless communication device 500 is a STA 102, communications with the AP 101 can be performed via the antenna 575. For example, in DL transmissions, in addition to receiving the received resource allocation information, the STA 102 may also receive spread payload data via multiple antennas 575 associated with the wireless communication device 500. The STA 102 can identify the respective resource allocation information that is allocated to that STA 102, and only de-spread the applicable spread payload data that was allocated for that STA 102. The processing device 505 may de-spread the received spread payload data over a plurality of sub-carriers using the resource allocation information, such as parameters (identification and length) of the spreading sequence to be used. In other examples, in UL transmission, after the STA 102 receives the resource allocation information, that STA 102 identifies the respective resource allocation information that is allocated to that STA 102, spreads payload data of that STA 102 using the resource allocation information that was allocated for that STA 102, and generates the UL transmission using the spread payload data.

In an example embodiment, the storage unit(s) 520 or memory 525 stores one or more spreading sequences. For example, the AP 101 may transmit resource allocation information to each STA 102 that identifies which spreading sequence is to be used by each STA 102 for spreading or de-spreading of the UL or DL transmission. The STA 102 can access the identified spreading sequence from the storage unit(s) 520 or memory 525 of that STA 102. More than one spreading sequence can be stored to provide additional flexibility when accounting for desired peak power consumption, data rate, channel usage, etc.

In some examples, a default spreading sequence is stored in the storage unit(s) 520 or memory 525, and used for the UL or DL transmission, as pre-agreed between the AP 101 and the STA 102 (using a prior control signal, or pre-loaded, etc.). In such an example, the control frame does not need to include the identification of which spreading sequence is to be used. The control frame only needs to identify the number of sub-carriers to spread the payload data, and the STA 102 accesses the default spreading sequence from the storage unit(s) 520 or memory 525 of that STA 102. The length of the spreading sequence to be used is equal to the number of the sub-carriers identified in the control frame, for de-spreading or spreading of the payload data, as applicable.

The wireless communication device 500 also includes a power supply block 545 to supply power to the wireless communication device 500. In some example, a battery 550 may provide the power to the wireless communication device 500 via the power supply block 545. The battery 550 may be a coin cell battery in example embodiments, for example when the wireless communication device 500 is an IoT device. A coin cell battery, also known as a button cell, is typically disc-shaped and has anode material such as zinc or lithium, and cathode material such as manganese dioxide, silver oxide, carbon monofluoride, cupric oxide or oxygen from the air. In some examples, the battery 550 can be other types of batteries, such as lithium-ion batteries, alkaline batteries, nickel-cadmium batteries, etc.

In some examples, a power adapter block 555 may be an alternating current/direct current (AC/DC) adaptor or a direct current/direct current (DC/DC) adaptor, in order to charge the battery 550 and to power the wireless communication device 500. The wireless communication device 500 can carry out monitoring of its own power status information (e.g., remaining battery capacity) of the battery 550. When the wireless communication device 500 is a STA 102, the STA 102 is configured to report its power status information to the AP 101.

In at least some examples, instructions that cause the processing device 505 to carry out methods in accordance with example embodiments are stored in storage unit(s) 520 or memory 525 of the wireless communication device 500. In some examples, the processing device 505 may be one or more controllers, which may comprise a modulator or a processor. Example systems and methods described herein, in accordance with examples, can be implemented by the one or more controllers. The one or more controllers can comprise hardware, software, or a combination of hardware and software, depending on the particular component and function. In some examples, the one or more controllers can include analog or digital components, and can include one or more processors, one or more non-transitory storage mediums such as memory storing instructions executable by the one or more processors, one or more transceivers (or separate transmitters and receivers), one or more signal processors (analog or digital), and one or more analog circuit components.

Example embodiments of the methods and systems for dynamically spreading payload data of each STA in accordance with each STA's power status information provide more flexibility of peak power consumption, PAPR, and data rate. By spreading payload data using a spreading sequence having a variably determined spreading sequence length, the payload data is spread over a number of sub-carriers, which may further help to enhance resistance to noise and interference. Moreover, adaptively determining resource allocation information in accordance with continually updated status information of a STA, in order to spread payload data over a number of subcarriers, may reduce peak transmission power significantly and provide flexible data rate within an OFDMA system, compared to conventional approaches such as MC-CDMA systems, MC-DS-CDMA systems and so on.

In various examples, each STA, such as wearable device powered by a coin cell battery, can report its battery status to an AP in real-time. The AP may determine resource allocation information to spread respective payload data over the same or different sub-carriers within a RU in order to provide flexible and adaptive resource allocation for each STA in accordance with that STA's battery status. Lower peak power consumption for coin cell batteries within each STA may be satisfied by spreading data symbols over a plurality of sub-carriers within a RU. Spreading each data symbol over a variably-determined number of sub-carriers provides flexible power efficiency and data rate options to improve performance such as spectrum efficiency and network throughput in ultra-dense scenarios.

Example embodiments are not necessarily limited to MU transmission and may be applicable more broadly to any other suitable transmission, such as single user (SU) transmission.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. Certain adaptations and modifications of the described embodiments can be made. Therefore, the above discussed embodiments are considered to be illustrative and not restrictive. Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method performed by an access point (AP), the method comprising:
   receiving, from a station (STA), status information of the STA including power status information of the STA;
   determining resource allocation information for a transmission with the STA in one or more resource units (RUs), the resource allocation information including a number of sub-carriers of the one or more RUs for spreading of payload data including a plurality of series of data bits of the STA, each series of data bits being modulated into a modulated data symbol, for each modulated data symbol, the spreading being performed by using a spreading sequence to spread the modulated data symbol to generate the number of spread data symbols on the number of sub-carriers, the number of sub-carriers being equal to a length of the spreading sequence, the length of the spreading sequence being determined based on the power status information of the STA, wherein the number of sub-carriers is inversely proportional to transmission spectral power density of the power status information, wherein the number of sub-carriers is less than a maximum number of available sub-carriers defined by a scheduled RU or RUs;
   transmitting to the STA the resource allocation information; and
   repeating the receiving of the power status information and the determining of the resource allocation information at periodic intervals or after the transmission with the STA of the payload data which is spread over the one or more RUs.

2. The method of claim 1, further comprising receiving the transmission from the STA that includes the payload data which is spread over the one or more RUs.

3. The method of claim 1, wherein the power status information of the STA includes remaining battery capacity of the STA, the number of sub-carriers for spreading of the payload data being determined based on the remaining battery capacity.

4. The method of claim 3, further comprising determining a maximum peak power consumption value of the transmission or a maximum Peak-To-Average Power Ratio (PAPR) value of the transmission from the remaining battery capacity of the STA, the number being determined by the AP such that transmitted power of the STA does not exceed the maximum peak power consumption value or the maximum Peak-To-Average Power Ratio (PAPR) value.

5. The method of claim 1, further comprising determining network status information that includes required data rate or channel condition, the number of sub-carriers being determined based on the required data rate or the channel condition.

6. The method of claim 1, wherein the resource allocation information includes identification of one or more spreading sequences for the spreading of the payload data of the STA.

7. The method of claim 1, wherein the resource allocation information is included within a control frame.

8. The method of claim 7, wherein the transmission is an uplink (UL) transmission, and wherein the control frame is a trigger frame for the uplink (UL) transmission, the method further comprising:
   receiving the UL transmission from the STA that includes the payload data that was spread over the one or more RUs; and
   de-spreading the received payload data that was spread over the one or more RUs.

9. The method of claim 1,
   wherein the resource allocation information identifies a first spreading sequence for spreading a first modulated data symbol of the STA, and the first spreading sequence is used for spreading the first modulated data symbol of the STA into first spread data symbols;

wherein the resource allocation information identifies a second spreading sequence that is orthogonal to the first spreading sequence, and the second spreading sequence is used for spreading a second modulated data symbol into second spread data symbols; and wherein the first spread data symbols and the second spread data symbols are modulated over the one or more RUs.

10. The method of claim 1, wherein the transmission is a multi-user (MU) transmission by multiple STAs including a first STA and a second STA, wherein, for the MU transmission, the resource allocation information identifies a first spreading sequence for spreading a first series of data bits of first payload data of the first STA, and the first spreading sequence is used for spreading a first modulated data symbol that is generated by performing modulation on the first series of data bits into first spread data symbols;

wherein, for the MU transmission, the resource allocation information identifies a second spreading sequence that is orthogonal to the first spreading sequence, and the second spreading sequence is used for spreading a second series of data bits of second payload data of the second STA into second spread data symbols; and wherein the first spread data symbols and the second spread data symbols are modulated over the number of sub-carriers.

11. The method of claim 1, wherein the transmission is a multi-user (MU) transmission by multiple STAs including a first STA and a second STA, wherein the number of sub-carriers are in one Resource Unit (RU), wherein, for the MU transmission, the resource allocation information identifies a first spreading sequence for spreading a first series of data bits of first payload data of the first STA, the first spreading sequence is used for spreading a first modulated data symbol that is generated by performing modulation on the first series of data bits into first spread data symbols, and the first series of data bits are modulated over a first plurality of sub-carriers in the RU;

wherein, for the MU transmission, the resource allocation information identifies a second spreading sequence for spreading a second series of data bits of second payload data of the second STA, the second spreading sequence is used for spreading a second modulated data symbol that is generated by performing modulation on the second series of data bits into second spread data symbols, and the second series of data bits are modulated over a second plurality of sub-carriers in the RU; and wherein the first plurality of sub-carriers is different than the second plurality of sub-carriers.

12. The method of claim 1, wherein the number of sub-carriers is less than a maximum number of available sub-carriers defined by one of the RUs.

13. The method of claim 1, wherein the resource allocation information includes a remaining number of sub-carriers in the maximum number of available sub- carriers defined by the scheduled RU or RUs, wherein the resource allocation information includes the remaining number of sub-carriers resource allocation information of the one or more RUs for spreading of second modulated data symbols of second payload data of a second STA.

14. The method of claim 1, further comprising transmitting the transmission to the STA that includes the payload data which is spread over the one or more RUs.

15. An Access Point (AP), comprising:
a transmitter; and
one or more controllers configured to:
receive status information of the STA including power status information of the STA,
determine resource allocation information for a transmission with the STA in one or more resource units (RUs), the resource allocation information including a number of sub-carriers of the one or more RUs for spreading of payload data including a plurality of series of data bits of the STA, each series of data bits being modulated into a modulated data symbol, for each modulated data symbol, the spreading being performed by using a spreading sequence to spread the modulated data symbol to generate the number of spread data symbols on the number of sub-carriers, the number being equal to a length of the spreading sequence, the length of the spreading sequence being determined based on the power status information of the STA, wherein the number of sub-carriers in inversely proportional to transmission spectral power density of the power status information, wherein the number of sub-carriers is less than a maximum number of available sub-carriers defined by a scheduled RU or RUs,
transmit to the STA the resource allocation information, and
repeat the receiving of the power status information and the determining of the resource allocation information at periodic intervals or after transmission with the STA of the payload data which is spread over the one or more RUs.

* * * * *